United States Patent
Yoneda

(10) Patent No.: US 11,941,729 B2
(45) Date of Patent: Mar. 26, 2024

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Keigo Yoneda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 89 days.

(21) Appl. No.: 17/525,251

(22) Filed: Nov. 12, 2021

(65) Prior Publication Data

US 2022/0189078 A1    Jun. 16, 2022

(30) Foreign Application Priority Data

Dec. 11, 2020 (JP) .................................. 2020-206041
Oct. 8, 2021 (JP) .................................. 2021-166499

(51) Int. Cl.
*G06T 11/00* (2006.01)
*G06F 18/24* (2023.01)
(Continued)

(52) U.S. Cl.
CPC ............ *G06T 11/001* (2013.01); *G06F 18/24* (2023.01); *G06T 7/50* (2017.01); *G06T 7/70* (2017.01);
(Continued)

(58) Field of Classification Search
CPC . G06T 11/001; G06T 7/50; G06T 7/90; G06T 7/70; G06T 2207/2012; G06T 2207/30244; G06F 18/24; H04N 1/58; H04N 1/60; H04N 1/6027; H04N 1/6041; H04N 1/6075; H04N 1/6077; H04N 5/57–58; H04N 13/117; H04N 13/15; H04N 13/156; H04N 13/257; H04N 13/279; H04N 9/64; H04N 9/69; H04N 9/73–9/77; G09G 5/00; G09G 5/30; G09G 5/377; G09G 2320/02; G09G 2320/0233; G09G 2320/0242; G09G 2320/0626; G09G 2320/066; G09G 2320/0666;
(Continued)

(56) References Cited

U.S. PATENT DOCUMENTS 10,916,048 B2    2/2021  Yoneda
11,507,193 B2 *  11/2022 Bradski ................. G06F 3/0346
(Continued)

FOREIGN PATENT DOCUMENTS

JP    2014-203326 A    10/2014

*Primary Examiner* — Wesner Sajous
(74) *Attorney, Agent, or Firm* — Carter, DeLuca & Farrell LLP

(57) ABSTRACT

An image processing apparatus obtains one or plurality of images based on capturing by one or plurality of image capturing apparatuses, obtains information related to a virtual object, and generates a two-dimensional image including the virtual object, based on the one or plurality of obtained images and the obtained information related to the virtual object. The image processing apparatus generates the two-dimensional image by determining color information of the virtual object based on color information of a real object included in the one or plurality of images.

22 Claims, 14 Drawing Sheets

(51) Int. Cl.
    *G06T 7/50*    (2017.01)
    *G06T 7/70*    (2017.01)
    *G06T 7/90*    (2017.01)
    *G06T 15/20*   (2011.01)

(52) U.S. Cl.
    CPC ...... *G06T 7/90* (2017.01); *G06T 2207/20212* (2013.01); *G06T 2207/30244* (2013.01)

(58) Field of Classification Search
    CPC ... G09G 2320/0673; G09G 2320/0686; G09G 2320/068; G09G 2340/0457; G09G 2340/10; G09G 2340/12
    See application file for complete search history.

(56) References Cited

U.S. PATENT DOCUMENTS

| | | | |
|---|---|---|---|
| 2002/0015522 A1* | 2/2002 | Rogina | H04N 13/344 348/E13.071 |
| 2019/0094981 A1* | 3/2019 | Bradski | H04N 21/414 |
| 2019/0182470 A1* | 6/2019 | Mizuno | G06T 15/205 |
| 2019/0221029 A1* | 7/2019 | Yoneda | G06T 7/70 |
| 2020/0145635 A1 | 5/2020 | Yoneda | |
| 2021/0120224 A1 | 4/2021 | Yoneda | |
| 2021/0358204 A1 | 11/2021 | Yoneda | |
| 2022/0051469 A1 | 2/2022 | Yoneda | |
| 2023/0079929 A1* | 3/2023 | Bradski | H04N 13/189 |

* cited by examiner

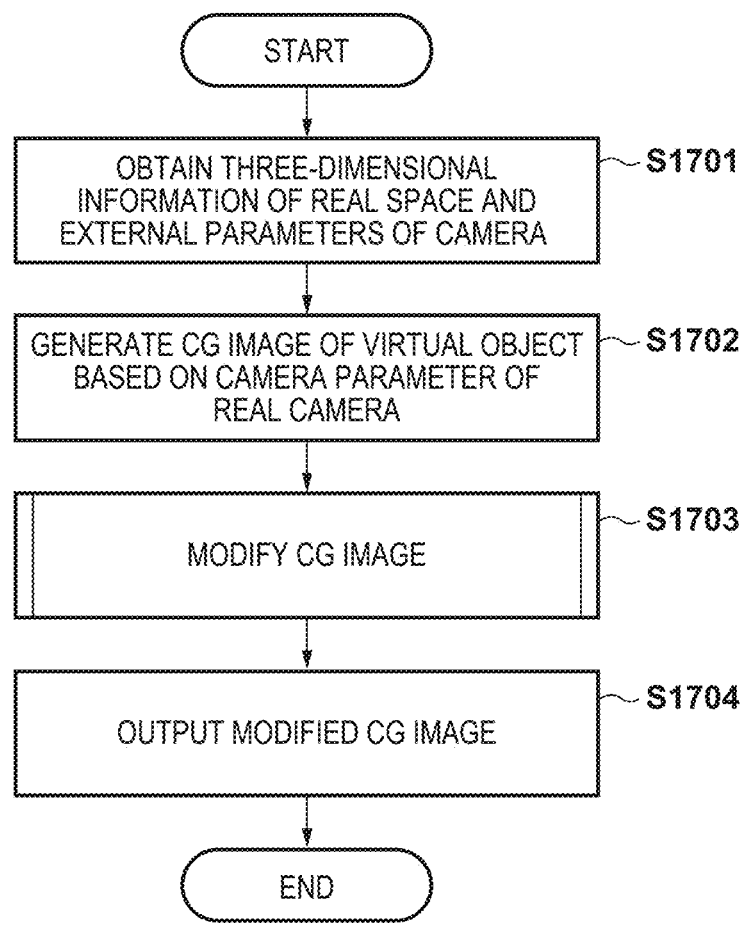

IMAGE PROCESSING APPARATUS, METHOD FOR CONTROLLING IMAGE PROCESSING APPARATUS, AND STORAGE MEDIUM

BACKGROUND

Field

The present disclosure relates to an image processing apparatus for generating a virtual viewpoint image, a control method of the image processing apparatus, and a storage medium.

Description of the Related Art

There is a technique for using images captured by a plurality of physical cameras (hereinafter, multi-viewpoint images), to reproduce an image (hereinafter, virtual viewpoint image) from a camera (hereinafter, virtual camera) which is virtually arranged in a three-dimensional space. In addition, there is a technique of displaying while superimposing a computer graphics (hereinafter referred to as CG) image generated by capturing a virtual object with a virtual camera on such a virtual viewpoint image. For example, a virtual object, such as a virtual signboard for advertising purposes, is arranged in a three-dimensional space (hereinafter referred to as a virtual space) obtained by reconstructing a capturing space based on multi-viewpoint images. Then, by capturing this virtual space with a virtual camera, it becomes possible to superimposedly draw a virtual advertisement (CG image) on a virtual viewpoint image.

When a virtual viewpoint image based on a captured image and a CG image generated independently of the captured image are superimposedly displayed, unnaturalness such as the CG image in the virtual viewpoint image appearing to float may occur. Japanese Patent Laid-Open No. 2014-203326 (hereinafter, referred to as Document 1) discloses a configuration in which, in order to generate a more natural composite image of a captured image and a CG image, noise processing is performed to estimate and add noise generated in a captured image of a virtual object, and the noise-processed CG image is superimposed on a captured image to generate a composite image. According to Document 1, a reduction in unnaturalness in the composite image is achieved by aligning perceived noise of the captured image and the CG image.

However, in Document 1, it is not considered to align the perceived tint or resolution of the real object and perceived tint or resolution of the virtual object, which changes in accordance with the illumination conditions of the capturing space, the capturing conditions of the physical camera, and the like. Therefore, unnaturalness still occurs in the composite image of the virtual viewpoint image generated based on the captured image and the CG image of the virtual object.

SUMMARY

The purpose of the present disclosure is to appropriately generate virtual viewpoint images including virtual objects.

According to one aspect of the present disclosure, there is provided an image processing apparatus that performs: obtaining one or plurality of images based on capturing by one or plurality of image capturing apparatuses; obtaining information related to a virtual object; and generating a two-dimensional image including the virtual object, based on the one or plurality of obtained images and the obtained information related to the virtual object, wherein in the generating, the two-dimensional image is generated by determining color information of the virtual object based on color information of a real object included in the one or plurality of images.

According to another aspect of the present disclosure, there is provided a method for controlling an image processing apparatus, the method comprising: obtaining one or plurality of images based on capturing by one or plurality of image capturing apparatuses; obtaining information related to a virtual object; and generating a two-dimensional image including the virtual object, based on the one or plurality of obtained images and information related to the obtained virtual object, wherein in the generating, the two-dimensional image is generated by determining color information of the virtual object based on color information of a real object included in the one or plurality of images.

According to another aspect of the present disclosure, there is provided a non-transitory computer-readable storage medium storing a program for causing a computer to execute a method for controlling an image processing apparatus, the method comprising: obtaining one or plurality of images based on capturing by one or plurality of image capturing apparatuses; obtaining information related to a virtual object; and generating a two-dimensional image including the virtual object, based on the one or plurality of obtained images and information related to the obtained virtual object, wherein in the generating, the two-dimensional image is generated by determining color information of the virtual object based on color information of a real object included in the one or plurality of images.

Further features of the present disclosure will become apparent from the following description of exemplary embodiments with reference to the attached drawings.

BRIEF DESCRIPTION OF THE DRAWINGS

FIG. 17 is a flowchart showing an example of a CG image generation process according to the fifth embodiment.

DESCRIPTION OF THE EMBODIMENTS

Figure 1A:
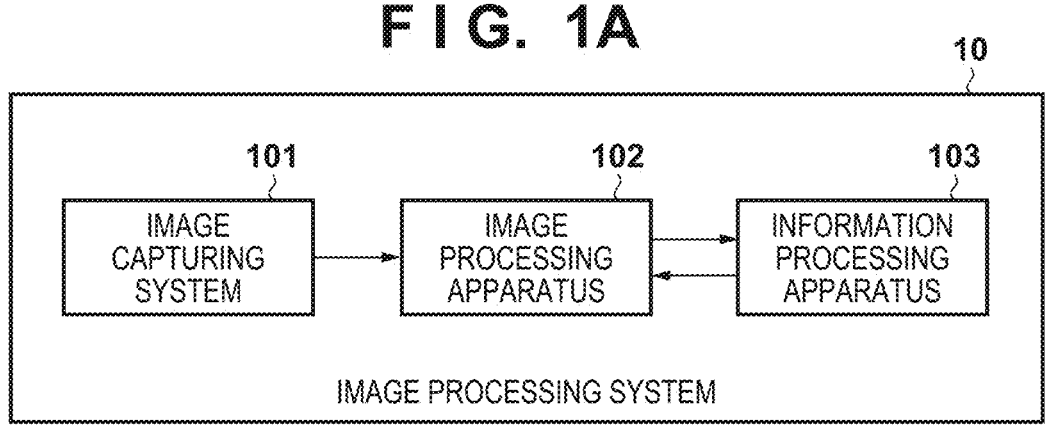
FIG. 1A is a block diagram illustrating an example of a configuration of an image processing system.

Hereinafter, embodiments will be described in detail with reference to the accompanying drawings. The following embodiments do not limit the present disclosure. Although a plurality of features are described in the embodiments, not all of the plurality of features are essential to the disclosure, and the plurality of features may be arbitrarily combined. Furthermore, in the accompanying drawings, the same reference numerals are assigned to the same or similar components, and a repetitive description thereof is omitted.

In the following embodiments, a "virtual viewpoint image" is an image generated by a user and/or a dedicated operator or the like freely operating a position and orientation of a virtual camera, and is also referred to as a free viewpoint image, an arbitrary viewpoint image, or the like. Unless otherwise specified, the description will be made on the assumption that the term "image" includes the concept of both a moving image and a still image.

First Embodiment

A real object, for example, a signboard that actually exists, that is rendered on a virtual viewpoint image will be brighter or darker in color due to the influence of weather, lighting, shadows of occluding objects, and the like. On the other hand, a virtual object drawn on a CG image, for example, a virtual signboard, does not have a brightness that accords to changes in the surrounding environment unless such illumination conditions are simulated and rendered. However, it is very difficult to faithfully simulate illumination conditions that change from moment to moment by computer graphics. A composite image obtained by compositing a virtual viewpoint image whose brightness changes depending on illumination conditions of a capturing space and a CG image independent of such changes may give an unnatural impression to a viewer.

In the first embodiment, a configuration will be described in which a more natural composite image is generated by adjusting the tint of a CG image when a composite image in which a CG image is superimposed on a virtual viewpoint image generated by a plurality of images from a plurality of viewpoints (hereinafter, referred to as a multi-viewpoint image) is generated. The adjustment of the tint of the CG image can be performed by, for example, modifying the saturation and/or brightness of the CG image based on texture data (i.e., color information) of a subject (real object) generated using multi-viewpoint images used for generating the virtual viewpoint image.

<Hardware Configuration of the Image Processing System>

FIG. 1A is a diagram illustrating an example of a configuration of an image processing system 10 according to a first embodiment. The image processing system 10 includes an image capturing system 101, an image processing apparatus 102, and an information processing apparatus 103 and generates a virtual viewpoint image, a CG image, and a composite image obtained by overlapping those images.

The image capturing system 101 has a plurality of image capturing apparatuses (hereinafter, also referred to as physical cameras) arranged at different positions, and performs synchronous image capturing by the plurality of physical cameras (in the present embodiment, simultaneous capturing of a plurality of physical cameras). The image capturing system 101, by simultaneously capturing a three-dimensional space by the plurality of physical cameras, obtains multi-viewpoint images comprising a plurality of captured images, and transmits them to the image processing apparatus 102.

The image processing apparatus 102 generates a virtual viewpoint image captured from the virtual camera based on the multi-viewpoint images. Further, the image processing apparatus 102 generates a CG image that is obtained by capturing a virtual object arranged in a three-dimensional space by the virtual camera. Then, the image processing apparatus 102 modifies the CG image based on the information (a texture) used for rendering the real object. More specifically, the image processing apparatus 102 modifies the CG image so as to align the tint of the real object and the virtual object on the basis of color information of a real object close to the virtual object, and generates a composite image by overlapping the modified CG image and the virtual viewpoint image. By such modification of the CG image, a CG image in which the tint changes according to the capturing conditions of the physical camera and the illumination conditions of the capturing space and the like of the image capturing system 101 is generated, and it is possible to obtain a more natural composite image. The viewpoint of the virtual camera is represented by a camera parameter determined by the information processing apparatus 103 to be described later. The image processing apparatus 102 transmits the generated composite image to the information processing apparatus 103.

The information processing apparatus 103 includes a controller for controlling a virtual camera (viewpoint), and a display unit for displaying a composite image or the like. The controller may be a joystick, a knob, a jog dial, and the like for operating the position and posture of the virtual camera, in addition to a general-purpose device such as a keyboard and a mouse for a user to perform an input operation. The display unit has one or a plurality of display devices (hereinafter referred to as "monitors") and displays information necessary for the user. When, for example, a touch panel display is employed as the display device, the touch panel may also serve as a part or the entirety of the above-described controller. A UI screen for controlling the virtual camera is displayed on the monitor. The user can indicate an operation amount of the virtual camera, that is, the moving direction, a direction (posture), a rotation, a movement distance, a moving speed, and the like while viewing the display of the monitor. The information processing apparatus 103 determines camera parameters indicating a position, an orientation, or a zoom of the virtual camera, etc., from an operation amount instructed by the user through the controller, and transmits the determined camera parameters to the image processing apparatus 102. The determined parameters may be displayed on the monitor as a state of the virtual camera. The information processing apparatus 103 receives the composite image generated by the image processing apparatus 102 and displays the composite image on a monitor.

Figure 1B:
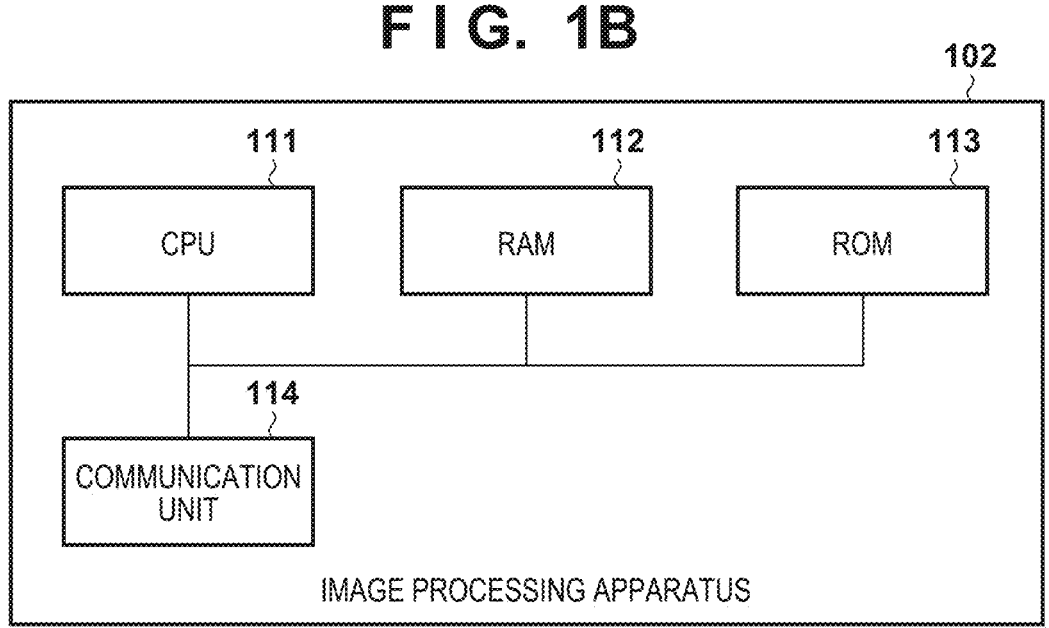
FIG. 1B is a block diagram illustrating an example of a hardware configuration of an image processing apparatus.

FIG. 1B is a diagram illustrating an example of a hardware configuration of the image processing apparatus 102. The image processing apparatus 102 includes a CPU 111, a RAM 112, a ROM 113 and a communication unit 114. The CPU 111 is a processor that executes a program stored in the ROM 113 using the RAM 112 as a work memory and comprehensively controls each component of the image processing apparatus 102. The CPU III executes various programs to realize the functional units shown in FIG. 2, which will be described later. The RAM 112 temporarily stores the computer program read from the ROM 113, results during calculation, and the like. The ROM 113 maintains computer programs and data that do not require modification. The data held in the ROM 113 includes camera parameters of the physical cameras, background models to be described later, 3D data of virtual objects, and the like. The communication unit 114 includes a communication unit such as Ethernet or USB, and performs communication with the image capturing system 101 and the information processing apparatus 103.

<Functional Configuration of the Image Processing Apparatus 102>

Figure 2:
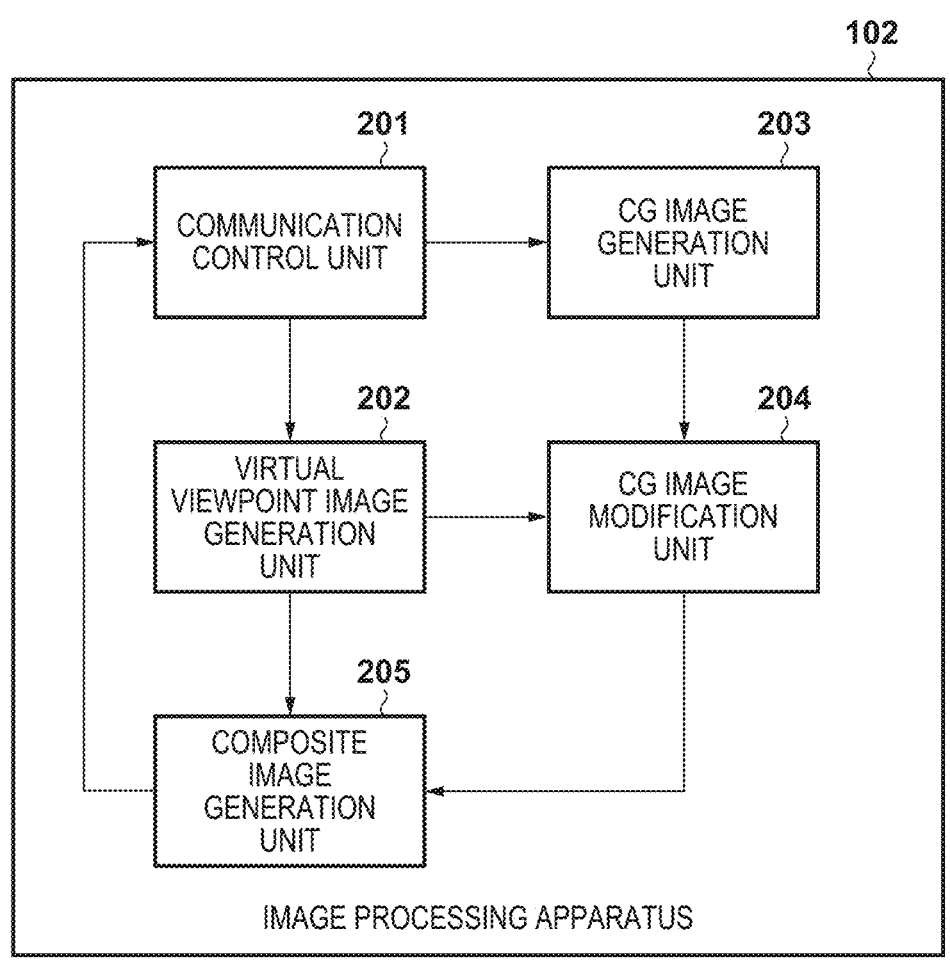
FIG. 2 is a block diagram illustrating an example of a functional configuration of the image processing apparatus.

FIG. 2 is a block diagram illustrating an example of a functional configuration of the image processing apparatus 102. FIG. 2 illustrates an example of a functional configuration in which a CG image is modified so as to be a CG image corresponding to a capturing condition of a physical camera or an illumination condition of a capturing space, and a process of generating a composite image is realized by overlapping the modified CG image and the virtual viewpoint image. The image processing apparatus 102 of this embodiment has, as a functional configuration, a communication control unit 201, a virtual viewpoint image generation unit 202, a CG image generation unit 203, a CG image modification unit 204, and a composite image generation unit 205.

The communication control unit 201 receives multi-viewpoint images from the image capturing system 101 using the communication unit 114 and receives the information of the camera parameters of the virtual camera from the information processing apparatus 103. The communication control unit 201 outputs the received multi-viewpoint images to the virtual viewpoint image generation unit 202, and outputs received camera parameters to the virtual viewpoint image generation unit 202 and the CG image generation unit 203. In addition, the communication control unit 201 inputs the composite image from the composite image generation unit 205, and transmits the composite image to the information processing apparatus 103 via the communication unit 114. The virtual viewpoint image generation unit 202 generates a virtual viewpoint image based on the multi-viewpoint images and the camera parameters of the virtual camera received from the communication control unit 201 and the camera parameters of the physical camera stored in advance in ROM 113.

The virtual viewpoint image generation unit 202 generates a virtual viewpoint image by, for example, the following method. First, the virtual viewpoint image generation unit 202 obtains a foreground image in which a foreground region corresponding to a predetermined object such as a person or a ball is extracted from the multi-viewpoint images, and a background image in which a background region other than the foreground region is extracted from the multi-viewpoint image. The virtual viewpoint image generation unit 202 generates a foreground model representing a three-dimensional shape of a predetermined object, information of a position in a virtual space of the foreground model, and texture data for drawing a surface of the foreground model based on the foreground image and the camera parameters of the physical camera. Further, the virtual viewpoint image generation unit 202 generates texture data for rendering a surface of the background model representing the three-dimensional shape of the background object such as a stadium previously stored in the ROM 113 on the basis of the background image. The virtual viewpoint image generation unit 202 generates a virtual viewpoint image by mapping texture data to the foreground model and the background model and rendering the virtual space according to the camera parameters of the virtual camera. However, the method of generating a virtual viewpoint image is not limited thereto, and it is possible to use various methods such as a method of generating a virtual viewpoint image by projection conversion of the captured image without using a three-dimensional model.

The foreground image is an image from which a region (foreground region) of a predetermined object is extracted from the multi-viewpoint images. The predetermined object is, for example, a dynamic object (moving body) that has movement (the absolute position or shape of which may change) when capturing is performed from a fixed position. Such objects include, for example, persons such as athletes and referees in the field where the competition takes place, balls used in ball sports, singers, performers, and moderators in concerts and entertainment or the like. The background image is an image of a region (background region) that is at least different from an object that is the foreground. More specifically, the background image refers to an object (a still object) that continues to be still or nearly still when capturing is performed from a fixed position. Such objects include, for example, concert stages, stadiums for events such as competitions, structures such as goals used in ball sports, fields, and the like.

The virtual viewpoint image generation unit 202 sends the virtual viewpoint image generated as described above to the CG image modification unit 204 and the composite image generation unit 205. In addition, the virtual viewpoint image generation unit 202 sends the multi-viewpoint images and intermediate data (for example the position of each foreground object in the virtual space, texture data thereof, and the like) generated when generating the virtual viewpoint image to the CG image modification unit 204.

Based on the camera parameters of the virtual camera received from the communication control unit 201, the CG image generation unit 203 performs processing such as capturing of a virtual object (projection of the virtual object onto the image), rasterization, determination of color, and the like, and generates a CG image. A virtual object is an object that comprises 3D data (mesh data, texture data, material data, etc.) and exists only in a virtual space. The CG image generation unit 203 obtains 3D data of the virtual object stored in the ROM 113 in advance, arranges the virtual object at a particular position in the virtual space, and generates an image viewed from the virtual camera. An example of the virtual object is a virtual signboard that does not exist in the capturing space of the physical camera, and a virtual advertisement image (CG image) is generated by the virtual camera capturing the virtual object. The CG image generation unit 203 sends the generated CG image and 3D data of the virtual objects used for generating the CG image to the CG image modification unit 204.

The CG image modification unit 204 modifies the CG image received from the CG image generation unit 203 using the virtual viewpoint image, the multi-viewpoint images, and the intermediate data sent from the virtual viewpoint image generation unit 202, and 3D data of the virtual objects sent from the CG image generation unit 203. The CG image modification unit 204 sends the modified CG image to the composite image generation unit 205. The modification of CG images will be described later with reference to FIGS. 3A and 3B. The composite image generation unit 205 combines the virtual viewpoint image input from the virtual viewpoint image generation unit 202 and the CG image input from the CG image modification unit 204 to generate a composite image in which the foreground, the background, and the CG are rendered. The composite image generation unit 205 outputs the generated composite image to the communication control unit 201.

<Explanation on Modification of the CG Image and Generation of the Composite Image>

Figure 3B:
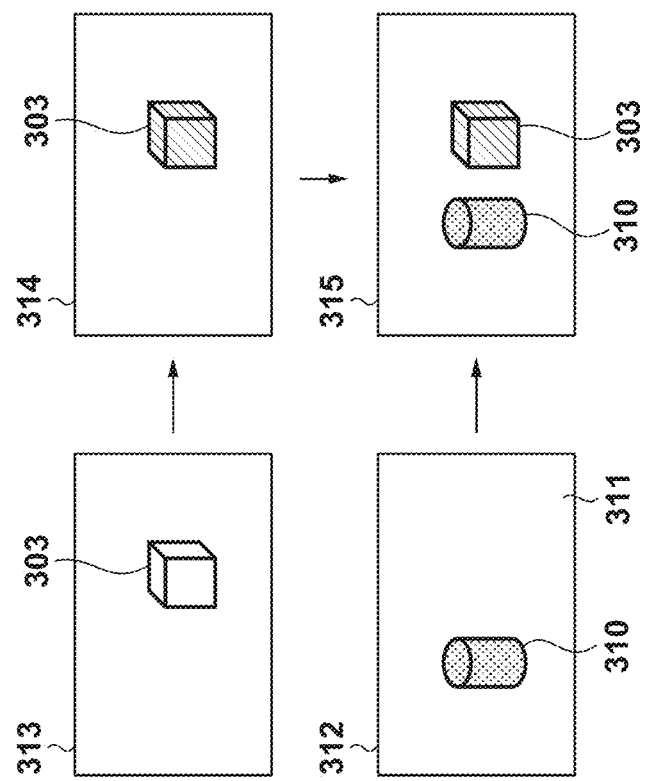
FIGS. 3A and 3B are diagrams for explaining generation of composite images according to a first embodiment.
Figure 3A:
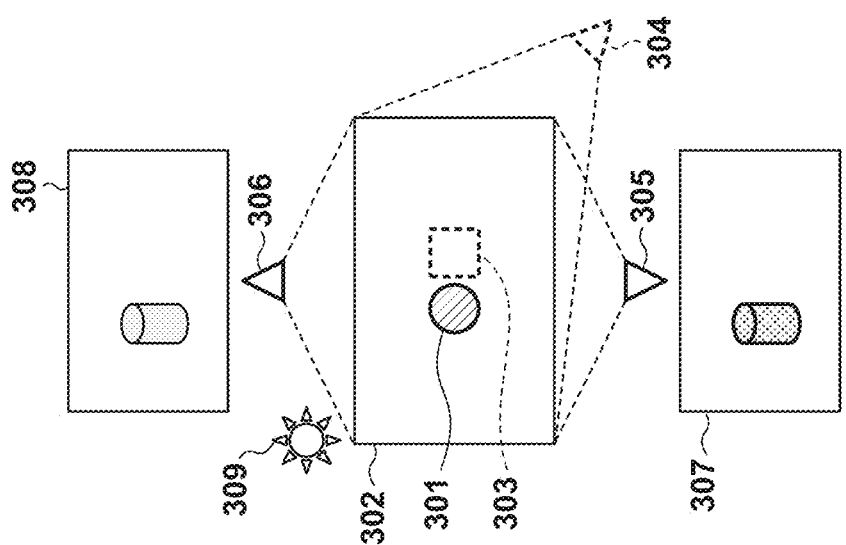

A procedure for modification of the CG image and generation of the composite image according to the first embodiment will be described with reference to FIGS. 3A and 3B. Here, as an example of the modification of the CG image by the CG image modification unit 204, a mode in which the tint of the CG image is changed based on a texture (color information) of a real object in the virtual viewpoint image will be described. FIG. 3A is a schematic diagram of a state in which a foreground object 301 and a background object 302 which are actually present in the capturing space, and a virtual object 303 which is not actually present in the capturing space of the image capturing system 101 are captured by the virtual camera 304 in a bird's-eye view. FIG. 3B is a schematic diagram for explaining how to composite the virtual viewpoint image 312 and the CG image 313 generated in FIG. 3A.

The physical camera 305 and the physical camera 306 of the image capturing system 101 capture the foreground object 301 and the background object 302 and generate the captured image 307 and the captured image 308. Since the foreground object 301 is illuminated by a light source 309 such as the sun or a light, the captured image 307 becomes a darker image due to being back-lit, and the captured image 308 becomes a brighter image due to being front-lit. The image processing apparatus 102 generates a foreground model 310 and a background model 311 in which the foreground object 301 and the background object 302 are reconstructed in the virtual space based on multi-viewpoint images captured by the image capturing system 101. Then, based on the camera parameters of the virtual camera 304 received from the information processing apparatus 103, the image processing apparatus 102 generates a virtual viewpoint image 312 obtained by capturing the foreground model 310 and the background model 311, and a CG image 313 obtained by capturing the virtual object 303.

When generating texture data of the foreground model 310, the image processing apparatus 102 preferentially uses the texture of the captured image of the physical camera 305 which is closer to the virtual camera 304 in order to be closer to the image captured from the virtual camera. Then, the foreground model 310 appearing in the virtual viewpoint image 312 becomes a darker image compared to the captured image 308. On the other hand, the CG image 313 is not affected by the illumination conditions of the capturing space of the image capturing system 101 unless the light source 309 is imitated in the virtual space, and there is no change in the color of the virtual object 303 even if the virtual camera 304 is moved. Therefore, if the virtual viewpoint image 312 and the CG image 313 are composited as they are, there is a possibility that the tints of the foreground model 310 and the virtual object 303 will be different from each other, resulting in an unnatural composite image. When generating the CG image 313, it is also possible to imitate the illumination in the capturing space of the image capturing system 101, but if there are a number of illuminations, such as the sun and stadium lights, the image processing apparatus 102 will require a great deal of processing time to simulate them. In addition, since the sun and stage lights change color and intensity from time to time, it is difficult to faithfully imitate them. Therefore, in order to generate a natural composite image, the image processing apparatus 102 according to the first embodiment generates a CG image 314 in which saturation and brightness of the CG image 313 are changed based on texture data of the foreground model 310 in the virtual viewpoint image 312. By compositing the CG image 314 obtained by modifying the CG image 313 as described above and the virtual viewpoint image 312, it is possible to generate a composite image 315 of a more natural virtual viewpoint image and a CG image.

<Control for Modification of the CG Image and Generation of the Composite Image>

Figure 4:
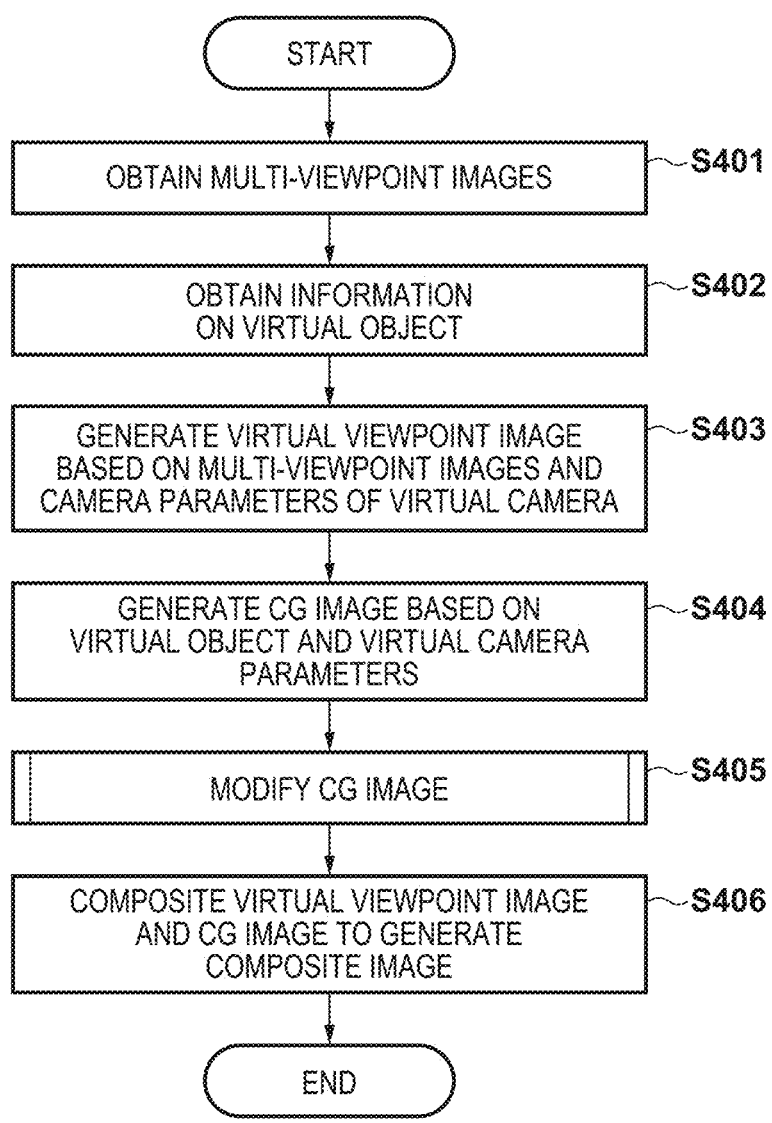
FIG. 4 is a flowchart showing an example of a composite image generation process according to the first embodiment.

FIG. 4 is a flowchart showing the generation of a CG image and a virtual viewpoint image and processing for compositing them according to the present embodiment. The process shown in FIG. 4 is realized, for example, by a control program stored in the ROM 113 being read out to the RAM 112 and the CPU 111 executing it. The communication control unit 201 receives multi-viewpoint images from the image capturing system 101 and receives the camera parameters of the virtual camera from the information processing apparatus 103. When the virtual viewpoint image generation unit 202 and the CG image generation unit 203 receive the received data from the communication control unit 201, the processing shown in FIG. 4 is started.

In step S401, a virtual viewpoint image generation unit 202 obtains a plurality of images from a plurality of image capturing apparatuses (a plurality of physical cameras). Although the multi-viewpoint images (a plurality of images captured by a plurality of image capturing apparatuses) are used in the present embodiment as the plurality of images, the present disclosure is not limited thereto. For example, the plurality of images may include a texture image of a foreground object obtained from each of the plurality of captured images, i.e., a partial image obtained by extracting a region of the foreground object from the captured images. Alternatively, the plurality of images may include a texture image of a background object obtained from each of the plurality of captured images, i.e., a partial image obtained by extracting a region of the background object from the captured images. In these cases, in the image capturing system 101, a foreground object and a background object are extracted from each of the captured images, and are sent to the image processing apparatus 102 as a plurality of images. When the image processing apparatus 102 receives the multi-viewpoint images, extraction of a foreground object and a background object from each of a plurality of captured images constituting the multi-viewpoint images can be performed, for example, by the virtual viewpoint image generation unit 202. In step S402, the CG image generation unit 203 obtains information related to the virtual object. Information related to a virtual object includes at least one of three-dimensional shape data (e.g., polygon data or voxel data) of the virtual object and an arrangement position (e.g., a position set by a user (operator)) of the virtual object in the virtual space.

In step S403, the virtual viewpoint image generation unit 202 generates a virtual viewpoint image captured by the virtual camera based on the multi-viewpoint images and camera parameters (the position of the virtual viewpoint, the orientation) of the virtual camera obtained in step S401. The camera parameters of the virtual camera are input from the communication control unit 201. That is, an image representing a real space observed from a specified virtual viewpoint is generated as a virtual viewpoint image. The generated virtual viewpoint image is sent to the composite image generation unit 205. Intermediate data (e.g., the position of each foreground object in the virtual space, texture data thereof, etc.) in the process of generating the virtual viewpoint image is sent to the CG image modification unit 204. In step S404, the CG image generation unit 203 generates a CG image obtained by capturing a virtual object from a virtual camera based on information about the virtual object acquired in step S402 and the camera parameters of the virtual camera. The camera parameters of the virtual camera are also used in step S403, and are inputted from the communication control unit 201. That is, an image representing a virtual object observed from a virtual viewpoint used for generating the virtual viewpoint image is generated as a CG image. The generated CG image is sent to the CG image modification unit 204.

In step S405, the CG image modification unit 204 modifies the CG image inputted from the CG image generation unit 203 based on the intermediate data inputted from the virtual viewpoint image generation unit 202. Details of the processing for modifying the CG image in step S405 will be described later by referring to FIG. 5. The modified CG image is output to the composite image generation unit 205. In step S406, the composite image generation unit 205 combines the virtual viewpoint image inputted from the virtual viewpoint image generation unit 202 and the modified CG image inputted from the CG image modification unit 204 to generate a composite image. Thereafter, the process ends. After the end of this processing, the generated composite image is transmitted from the composite image generation unit 205 to the information processing apparatus 103 via the communication control unit 201. The above is composite image processing of the virtual viewpoint image and the CG image according to the first embodiment.

<Explanation of the CG Image Modification Processing>

Figure 5:
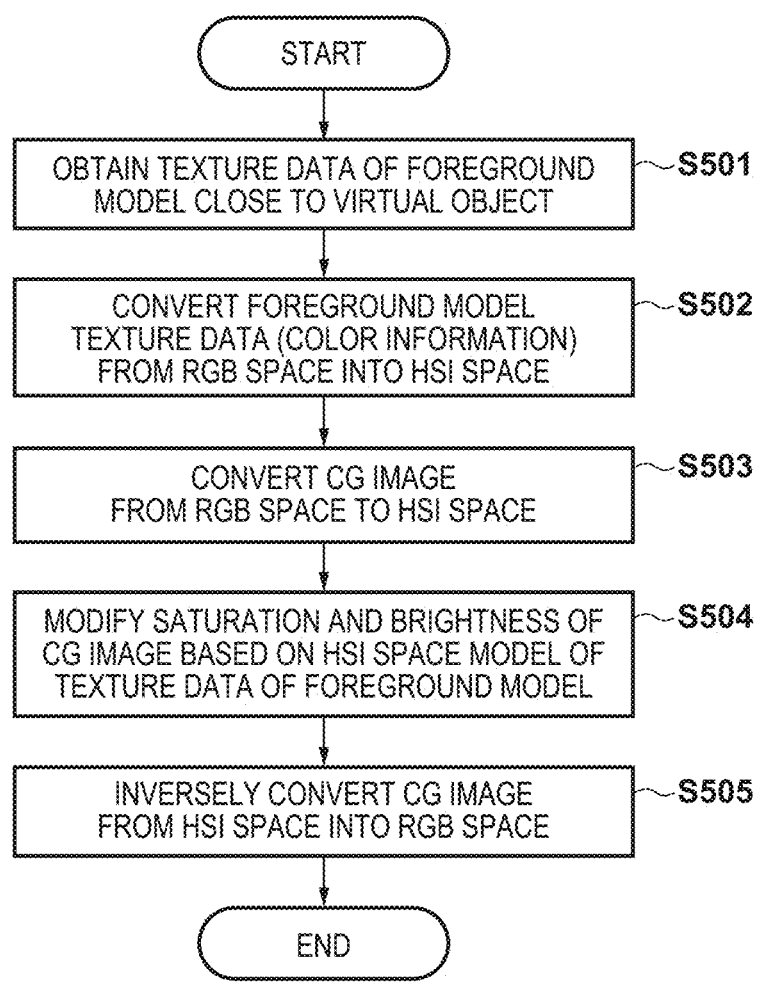
FIG. 5 is a flowchart showing an example of a CG image modification process according to the first embodiment.

FIG. 5 is a flowchart showing an exemplary process for modifying a CG image according to the present embodiment, and shows in detail the process of modifying the CG image in step S405 of FIG. 4. In the modification processing of the CG image in the first embodiment, color information of the CG image is determined and modified based on texture data (saturation and brightness) of the foreground model close to the virtual object in the three-dimensional space. More specifically, the CG image modification unit 204 obtains the saturation and the brightness of a foreground model close to the position where the virtual object is to be arranged in the virtual space, and changes the saturation and the brightness of the virtual object so as to approach these. The saturation and brightness of the CG image before modification are calculated by the CG image generation unit 203 based on texture data and material data of the virtual object. The processing shown in FIG. 5 is executed by the CG image modification unit 204. The processing shown in FIG. 5 starts with the intermediate data being obtained from the virtual viewpoint image generation unit 202 and the CG image being obtained from the CG image modification unit 204 as a trigger.

In step S501, the CG image modification unit 204 selects a foreground model close to the virtual object from the intermediate data inputted from the virtual viewpoint image generation unit 202, and obtains texture data thereof. The foreground model close to a virtual object is, for example, a foreground model of a real object that is at a position closest to the virtual object. The foreground model selected in step S501 is not limited thereto. For example, the foreground models of a predetermined number of real objects may be selected in order of proximity from the virtual object, or the foreground models of all real objects existing within a predetermined distance from the virtual object may be selected. That is, when the CG image is modified, when there are a plurality of foreground models located close to the virtual object, the CG image may be modified based on not only one foreground model but a plurality of foreground models. As the distance between the real object and the virtual object, for example, the distance between the barycentric positions of both objects, the shortest distance between the surfaces of both objects, or the like can be used. In addition, it is not necessary to use all texture data used for rendering the selected foreground model. That is, texture data of a portion of the foreground object (e.g., texture data corresponding to a portion within a predetermined range centered on a point closest to the virtual object of the foreground object) may be obtained.

In step S502, the CG image modification unit 204 converts the texture data of the foreground models obtained in step S502 from the RGB space to the HSI space. In step S503, the CG image modification unit 204 converts the color information of the CG image generated by the CG image generation unit 203 from the RGB space to the HSI space. In step S504, the CG image modification unit 204 modifies the saturation and brightness of the CG image based on the HSI space model of the texture data of the foreground model. For example, the CG image modification unit 204 calculates the average value of the saturation and the brightness of the texture data of the foreground model. Then, the CG image modification unit 204 changes the saturation and the brightness of the CG image so that the respective average values of the saturation and the brightness of the CG image aligns with or approaches the average value calculated for the texture data of the foreground model, while the hue of the CG image remains unchanged. In step S505, the CG image modification unit 204 inversely converts the CG image from the HSI space to the RGB space. The above is an example of the modification processing of the CG image according to the first embodiment.

As described above, in the first embodiment, processing for modifying the saturation and brightness of the CG image is performed by using the texture data of the foreground model generated based on the multi-viewpoint images. As a result, when the virtual viewpoint image and the CG image are superimposed, the tints of the real object of the virtual viewpoint image and the CG image become close to each other, and a more natural composite image can be generated.

In the first embodiment, an example in which the saturation and the brightness are modified using the texture data of the foreground model has been described, but the present disclosure is not limited thereto. For example, texture data of a background model may be used. Also, if the background model is large, such as a stadium or field, a portion thereof may be used. For example, the texture data of a portion of the texture data of the background model close to the virtual object may be extracted, and the extracted texture data may be used. Alternatively, an image captured by a physical camera selected based on the position and the orientation of the surface of the virtual object may be selected from the multi-viewpoint images, and the saturation and brightness of the selected captured image may be used. The orientation of the surface of the virtual object can be determined, for example, based on surface normals or vertex normals of the polygon. In this case, the color information of the whole of the selected captured image may be used, or a part of the selected captured image may be extracted and the color information of the image of the extracted part may be used. The image of the portion extracted from the captured image may be, for example, an image of a predetermined range in the vicinity of the virtual object, an image of a region of a real object close to the virtual object, or the like.

When the CG image is modified, the CG image may be gradually changed so that the CG image does not change abruptly. Instead of modifying the CG image every frame, a predetermined unit time may be set and the CG image may be modified every unit time. Also in this case, the CG image may be gradually changed. The modification of the CG image based on the multi-viewpoint images need not always be performed, and the user may switch whether to modify the CG image via the information processing apparatus 103. Further, the modification of the CG image may be performed not only based on the multi-viewpoint images, and a light source or material may be set and a modification applied by computer graphics. In the present embodiment, the CG image generation unit 203 and the CG image modification unit 204 are described separately, but the present disclosure is not limited thereto. For example, the CG image modification unit 204 may also function as some or all of the functions of the CG image generation unit 203. In this case, for example, the CG image modification unit 204 may generate a CG image while modifying an image of a virtual object based on (texture data obtained from) the multi-viewpoint image.

Second Embodiment

In the first embodiment, a configuration has been described in which the tints of a real object of the virtual viewpoint image and a virtual object of the CG image are aligned by modifying the saturation and brightness of the CG image superimposed on the virtual viewpoint image based on the texture of the foreground model, thereby reducing unnaturalness in the composite image. In the second embodiment, a configuration for reducing the unnaturalness caused by the difference in resolution between the real object and the virtual object will be described. For example, an image of a real signboard that is close to a physical camera or captured when zoomed in will have a higher resolution, whereas an image of a real signboard that is far from the physical camera or captured when zoomed out will have a lower resolution. As described above, although the resolution of the image of the real signboard differs depending on the capturing conditions, the resolution of the CG image of the virtual signboard, which is the virtual object, is always constant. Therefore, the image of the virtual signboard arranged in the virtual space and the image of the surrounding real signboards will end up with different resolutions, the resolutions of the signboards will be non-uniform, and there will be a possibility that an unnatural composite image will be generated.

In the second embodiment, the resolution of the texture data of the virtual model is modified according to the resolution of the texture data (i.e., color information) of the background model close to the virtual object. It should be noted that the description of the portions common to the first embodiment such as the hardware configuration and the functional configuration of the image processing apparatus 102 is omitted or simplified, and the description will be given below focusing on the modification control of the CG image, which is the point of difference.

Figure 6:
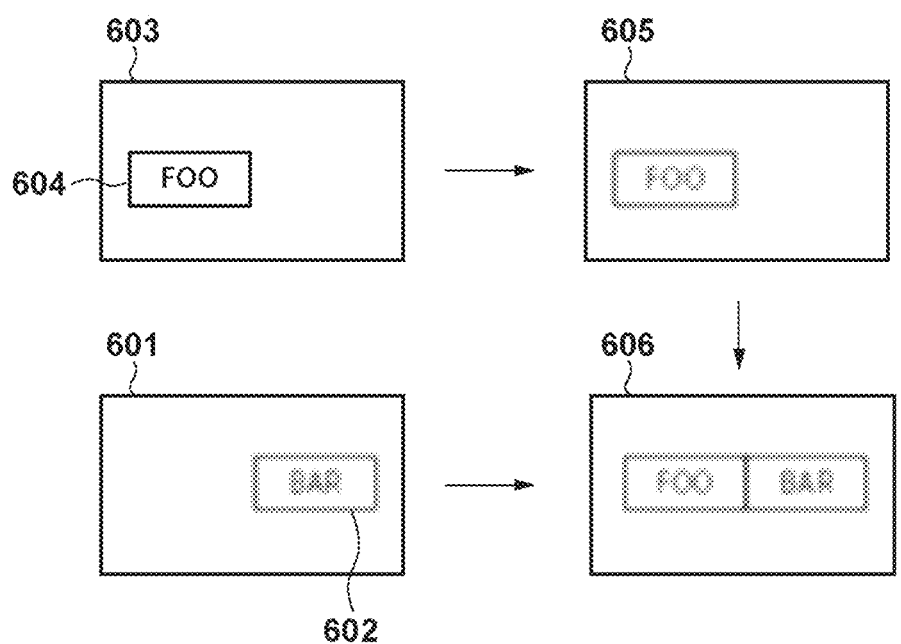
FIG. 6 is a diagram for explaining generation of composite images according to a second embodiment.
Figure 7:
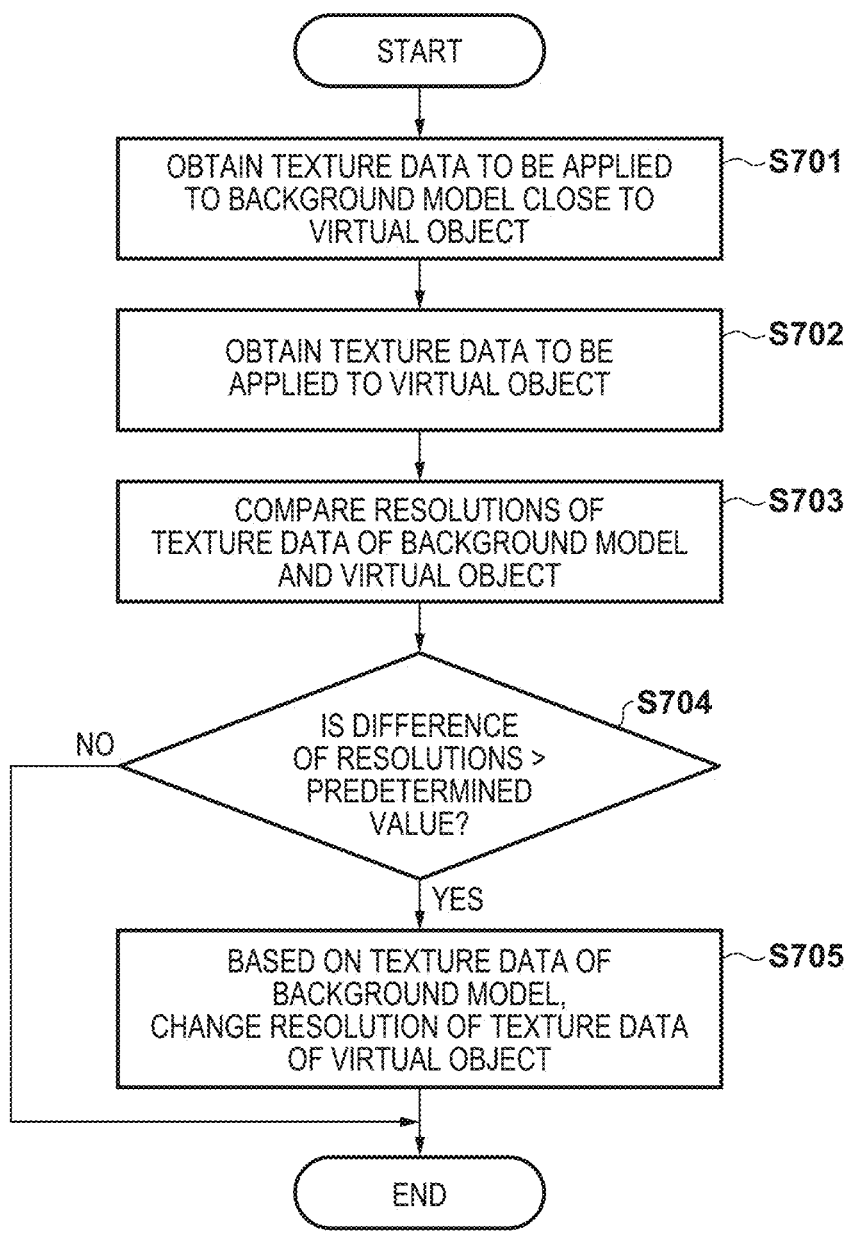
FIG. 7 is a flowchart showing an example of a CG image modification process according to the second embodiment.

FIG. 6 is a diagram illustrating a process of compositing a virtual viewpoint image and a CG image according to the second embodiment. FIG. 7 is a flowchart showing a CG image modification process according to the second embodiment. In the processing for modifying the CG image according to the second embodiment, the resolution of the CG image is changed in accordance with the resolution of the texture data for rendering the surface of the background model.

In FIG. 6, the virtual viewpoint image 601 is an image obtained by capturing a real signboard 602 existing in reality by the virtual camera, and the CG image 603 is an image obtained by capturing a virtual signboard 604 by the virtual camera. The resolution of the texture data of the virtual signboard 604 that appears in the CG image 603 is higher than the resolution of the texture data of the real signboard 602 of the virtual viewpoint image 601. If the CG image 603 is superimposed on the virtual viewpoint image 601 in a state in which the resolution of the texture data of the virtual signboard 604 is excessively higher than that of the real signboard 602, an unnatural composite image may be obtained. Therefore, the CG image modification unit 204 of the second embodiment modifies the CG image 603 so that the resolution of the texture data of the virtual signboard 604 approaches the resolution of the texture data of the real signboard 602 in the virtual viewpoint image 601. The composite image generation unit 205 superimposes the CG image 605 thus modified on the virtual viewpoint image 601, thereby generating a composite image 606 in which the unnaturalness caused by the difference in resolution is reduced or eliminated.

FIG. 7 is a flowchart showing in detail the processing of step S405 of FIG. 4, i.e., the processing for modifying the CG image. When the texture data of the background model is inputted from the virtual viewpoint image generation unit 202 and the texture data of the virtual object is inputted from the CG image generation unit 203, the CG image modification unit 204 starts the modification process shown in FIG. 7.

In step S701, the CG image modification unit 204 obtains texture data to be applied to a background model close to the virtual object. The texture data applied to the background model close to the virtual object is, for example, texture data obtained by extracting a portion close to the virtual object (a range of a predetermined size centered on a position closest to the virtual object) from the texture data of the background object. Of course, the present disclosure is not limited to this, and for example, the entirety of the texture data of the background model corresponding to the real object closest to the virtual object may be selected. In step S702, the CG image modification unit 204 obtains texture data to be applied to the virtual object.

In step S703, the CG image modification unit 204 compares the resolutions of the texture data of the background model and the virtual object. In the present embodiment, the resolution of the texture data of the background model is obtained, for example, from the number of pixels in the range over which the texture data is to be applied in the captured image that the texture data is based on, and the actual size of the range in the three-dimensional space. In the present embodiment, the resolution of the texture data of the virtual object is obtained from the size of the range over which the texture data is to be applied in the virtual object and the number of pixels of the CG image corresponding to the range. In step S704, the CG image modification unit 204 branches the processing according to the result of comparing the resolutions in step S703. If the difference in the resolution between the background model and the texture data of the virtual object is less than or equal to a predetermined value (NO in step S704), this process ends. In this instance, in the generation of the composite image in step S406, the CG image generated in step S404 is used as is.

If the difference in the resolution between the background model and the texture data of the virtual object is greater than the predetermined value (YES in step S704), the process advances from step S704 to step S705. In step S705, the CG image modification unit 204 changes the resolution of the texture data of the virtual object in the CG image based on the resolution of the texture data of the background model. For example, suppose that the virtual object and the background model are the same size and the resolution of the texture data of the virtual object is twice the resolution of the texture data of the background model. In this instance, the CG image modification unit 204 performs a modification to reduce the texture data size of the virtual object of the CG image generated in step S404 to 50%. In this manner, the resolution of the texture data of the images of the real signboard and the virtual signboard used in the composite image can be aligned with each other, or the resolutions of the texture data can be made close to each other.

As described above, according to the second embodiment, the CG image is modified by changing the resolution of the virtual object in accordance with the resolution of the texture data of the background model, and a more natural composite image is generated by superimposing the modified CG image and the virtual viewpoint image. Note that the texture data used for modifying the CG image is not limited to the background model, and the texture data of the foreground model existing near the virtual object may be used as in the first embodiment. In the second embodiment, the CG image is modified on the basis of the texture data of a signboard existing in reality (a real signboard) near the virtual signboard, but the present disclosure is not limited to this. For example, when a real signboard is replaced with a virtual signboard, the texture data of the virtual signboard may be changed based on the texture data of the real signboard to be replaced.

Third Embodiment

In the first embodiment and second embodiment, the texture data is selected based on a real object selected based on the positional relationship with the virtual object, and the modification of the CG image is performed based on the selected texture data. In the third embodiment, a type of the real object (player, ball, signboard, etc.) existing in the space to be captured by the image capturing system 101 is identified, and the CG image is modified based on texture data of the real object selected based on the identified type and the type of the virtual object. It should be noted that the description of the portions common to the first embodiment such as the hardware configuration and the functional configuration of the image processing apparatus 102 is omitted or simplified, and the description will be given below focusing on the processing for modifying the CG image, which is the point of difference.

Figure 8:
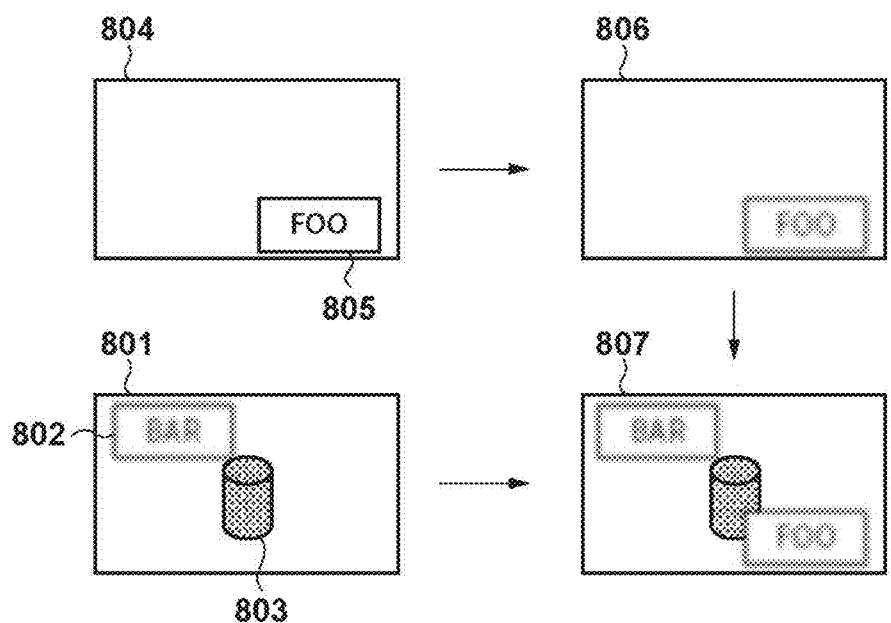
FIG. 8 is a diagram for explaining generation of composite images according to a third embodiment.
Figure 9:
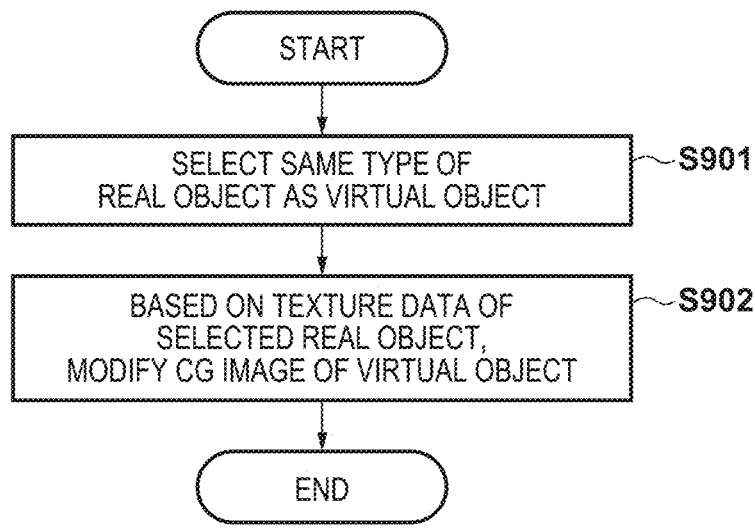
FIG. 9 is a flowchart showing an example of a CG image modification process according to the third embodiment.

FIG. 8 is a diagram illustrating a process of compositing a virtual viewpoint image and a CG image according to the third embodiment. FIG. 9 is a flowchart for describing a CG image modification process according to the third embodiment. As described above, in the third embodiment, the type of the object is identified, and the CG image is modified according to the texture data of a predetermined object among the objects for which the type is identified.

In FIG. 8, the virtual viewpoint image 801 is an image in which a signboard 802 that is actually present and an object 803 that is not a signboard are captured by the virtual camera. A CG image 804 is an image obtained by capturing a virtual signboard 805 with a virtual camera. The texture data of the virtual signboard 805 has a higher resolution than that of the signboard 802 that actually exists. In the second embodiment, a method of modifying the resolution of the CG image using texture data of a foreground or background model close to the virtual object was described. In contrast to this, the CG image modification unit 204 of the third embodiment identifies the type of the object of the foreground or background model, selects an object of a preset type, and modifies the CG image using the texture data of the selected object.

In the example of FIG. 8, the type of the virtual object is a signboard, the signboard 802 which is a real object of the same type is selected, and the texture data of the virtual signboard 805 is changed based on the texture data. The composite image generation unit 205 superimposes the CG image 806 thus modified on the virtual viewpoint image 801 to generate a composite image 807. For example, the tint or resolution of the virtual object is changed based on the tint or resolution of the texture data of the real object. The tint change is as described in the first embodiment, and the resolution change is as described in the second embodiment. As a result, it is possible to generate a composite image that is less unnatural when a signboard that actually exists and a virtual signboard appear on the virtual camera by making the real signboard and the virtual signboard appear similar in tint and resolution.

The processing shown in the flowchart of FIG. 9 is processing executed by the CG image modification unit 204 of the third embodiment. When the respective position and the texture data of the foreground model or the background model is inputted from the virtual viewpoint image generation unit 202 and the texture data of the virtual object is inputted from the CG image generation unit 203, the CG image modification unit 204 starts the process shown in FIG. 9. FIG. 9 is a flowchart for describing in detail the processing of step S405 of FIG. 4, i.e., the processing for modifying the CG image.

In step S901, the CG image modification unit 204 identifies the type of a real object of a foreground or background model, and selects the same type of the real object as the virtual object. An object detection algorithm, for example, may be used to identify the type of object. In the case of the background model, for example, information indicating the type may be embedded in the mesh data. In step S902, the CG image modification unit 204 modifies the CG image of the virtual object based on the texture data of the real object selected in step S901. The modification of the CG image is as described in the first embodiment and the second embodiment.

As described above, according to the third embodiment, the CG image is modified based on the texture data for the object of a predetermined type from among the real objects whose type is identified. According to the third embodiment, for example, when generating a composite image in which one of a plurality of real signboards is replaced with a virtual signboard, the CG image can be modified more reliably using texture data of an object of a signboard. As described above, since the CG image is modified by the texture data of a real object of the same type as the virtual object, a more natural composite image can be obtained. Needless to say, the first embodiment to third embodiment can be used in combination as appropriate.

Fourth Embodiment

In the first embodiment to the third embodiment, a process for modifying a CG image on the basis of texture data of an object generated from multi-viewpoint images when the CG image is superimposed on a virtual viewpoint image that is a two-dimensional image is described. In the fourth embodiment, an augmented reality (AR) image is used as the two-dimensional image. That is, in the fourth embodiment, an aspect of modifying the CG image will be described based on a captured image of the camera in augmented reality. Recently, various services using AR (Augmented Reality) technologies have been provided. By using AR technology, CG images can be superimposedly displayed over an image (real image) in which a real space is captured. For example, a virtual advertisement (CG image) can be displayed on a real image. However, when the real image and the CG image are overlappingly displayed the CG image may appear to unnaturally float in the real image. This is similar to the unnaturalness described in the first embodiment to the third embodiment. In augmented reality it is necessary to align the perceived tint and resolution of an object (real object) existing in the real space in the real image and a virtual object in the CG image in accordance with illumination conditions of the capturing space, capturing conditions of the camera, and the like. Therefore, in the fourth embodiment, as an example of aligning tints of a real object and a virtual object, a method of modifying saturation and/or brightness of a CG image based on the real image captured by the camera will be described. Parts common to the first embodiment to the third embodiment are omitted or simplified for explanation.

<Hardware Configuration of the Image Processing System>

Figure 10:
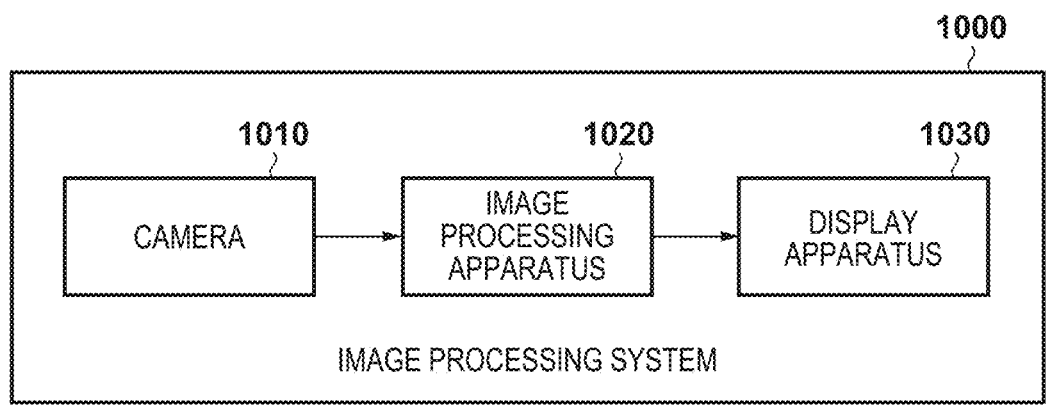
FIG. 10 is a block diagram illustrating an example of a configuration of the image processing system according to a fourth embodiment.

FIG. 10 is a diagram illustrating an example of an overall configuration of an image processing system according to the present embodiment. An image processing system 1000 obtains an image captured by a camera, and determines color information of a CG image according to color information of a real object appearing in the captured image. Then, the image processing system 1000 generates and outputs a composite image based on the determined color information of the CG image. The image processing system 1000 includes a camera 1010, an image processing apparatus 1020, and a display apparatus 1030. An example of the hardware configuration of the image processing apparatus 1020 of the fourth embodiment is as described in the first embodiment (FIG. 1(b)).

The camera 1010 captures the real space. The captured image, internal parameters of the camera 1010 calculated in advance, and the like are transmitted to the image processing apparatus 1020. The internal parameters of the camera are camera-specific internal parameters such as focal length, image center, and lens distortion parameters. Note that the number of cameras is not limited to one, and a plurality of cameras may be used. When there are multiple cameras, a plurality of captured images and internal parameters are transmitted to the image processing apparatus 1020. In the present embodiment, the processing for modifying the CG image based on the captured image of one camera has been described, but the present disclosure is not limited thereto, and one CG image may be modified based on a plurality of captured images.

The image processing apparatus 1020 estimates three-dimensional information of the real space and a position and orientation of the camera based on the captured image input from the camera 1010 and the internal parameters of the camera. The three-dimensional information of the real space and the estimation of the position and orientation of the camera are performed using, for example, a technique such as Visual SLAM. Using this technique, it is possible to calculate three-dimensional information around the camera and parameters (external parameters of the camera) indicating the position and orientation of the camera. For three-dimensional information of the real space, for example, in the case of Visual SLAM, the feature points of the surrounding objects are recognized from the image captured by the camera, and are outputted as a set of three-dimensional coordinates of a large number of feature points (group of points). In other words, the three-dimensional information (three-dimensional coordinates) of a group of real objects in the real space can be obtained. The estimation of the three-dimensional information of the real space is not limited to this method, a sensor such as a laser sensor as typified by a LiDAR may be used or used in combination, and the image processing apparatus 1020 may include various sensors (a depth sensor or an accelerometer). The three-dimensional information of the real object group may include not only three-dimensional coordinates but also information such as the type of a real object (a signboard, a floor, a wall, etc.) corresponding to three-dimensional coordinates by using an object recognition technique. The estimation of the external parameters of the camera is not limited to the above-described method. For example, the estimation of the external parameters of the camera may be geometrically calculated by detecting a marker which is installed in the real space and has unique identification information. The external parameters of the camera are represented, for example, by a rotation matrix and a position vector. The internal parameters and external parameters of the camera are combined and referred to as camera parameters. In the present embodiment, it is assumed that the position and orientation of the actual camera (real camera) is aligned with the position and orientation of the virtual camera, and the camera parameters of the virtual camera are aligned with the camera parameters of the real camera. Note that the present disclosure is not limited to this, and the camera parameters of the real camera and the virtual camera may be different from each other. It is also assumed that the coordinate system of the real space in which the three-dimensional information is estimated and the virtual space in which the virtual advertisement is arranged coincide with each other.

Based on the obtained camera parameters, the image processing apparatus 1020 captures a virtual space in which a virtual object such as a virtual advertisement is arranged, and generates a CG image. 3D data of the virtual object is stored in advance in a ROM 113 (FIG. 1(b)), and is read and used. The 3D data of the virtual object has arrangement information (orientation information and position information), and the virtual object is arranged in the virtual space based on the arrangement information. Note that the arrangement position of the virtual object is not limited to this, and the image processing apparatus 1020 may change the position and orientation of the virtual object, or may arrange the virtual object at an arbitrary position and orientation in the virtual space. Then, the image processing apparatus 1020 modifies the CG image based on the captured image and the three-dimensional information of the generated real object group. More specifically, the image processing apparatus 1020 modifies the CG image so as to align the tint of the real object and the virtual object on the basis of color information of a real object close to the virtual object. First, the image processing apparatus 1020 selects a real object (or point) close in proximity to the virtual object using three-dimensional information of a group of real objects, and projects the selected real object (or point) on the captured image based on the camera parameters. Then, the image processing apparatus 1020 obtains the color information of the projection destination, and changes and modifies the color information of the virtual object based on the color information. Finally, the image processing apparatus 1020 superimposes the captured image and the modified CG image to generate a composite image. By such modification of the CG image, a CG image in which the tint changes according to the capturing conditions of the camera 1010 and the illumination conditions of the capturing space and the like is generated, and it is possible to obtain a more natural composite image.

The image processing apparatus 1020 outputs the generated composite image to the display apparatus 1030.

A display apparatus 1030 displays the composite image generated and outputted by the image processing apparatus 1020. The display apparatus 1030 realizes the augmented reality by successively updating and continuously displaying the composite image. The user looks at the composite image displayed on the display apparatus 1030 and operates the camera 1010 to specify the zoom and position and orientation of the camera. The display apparatus 1030 is, for example, a monitor, a tablet, or a video see-through type head-mounted display (HMD).

In the present embodiment, the camera 1010, the image processing apparatus 1020, and the display apparatus 1030 are envisioned as separate apparatuses, but the present disclosure is not limited thereto, and the image processing apparatus 1020 may also function as the camera 1010 or the display apparatus 1030. For example, in the case of displaying a composite image on a tablet employing a touch panel display with a built-in camera, the tablet can also serve as the camera 1010, the image processing apparatus 1020, and the display apparatus 1030. A composite image is displayed on the touch panel display of the tablet, and a user touches the touch panel display to operate the tablet, and a CPU, a RAM, and a ROM, which will be described later, are coordinated to generate a composite image.

<Functional configuration of the Image Processing Apparatus>

Figure 11:
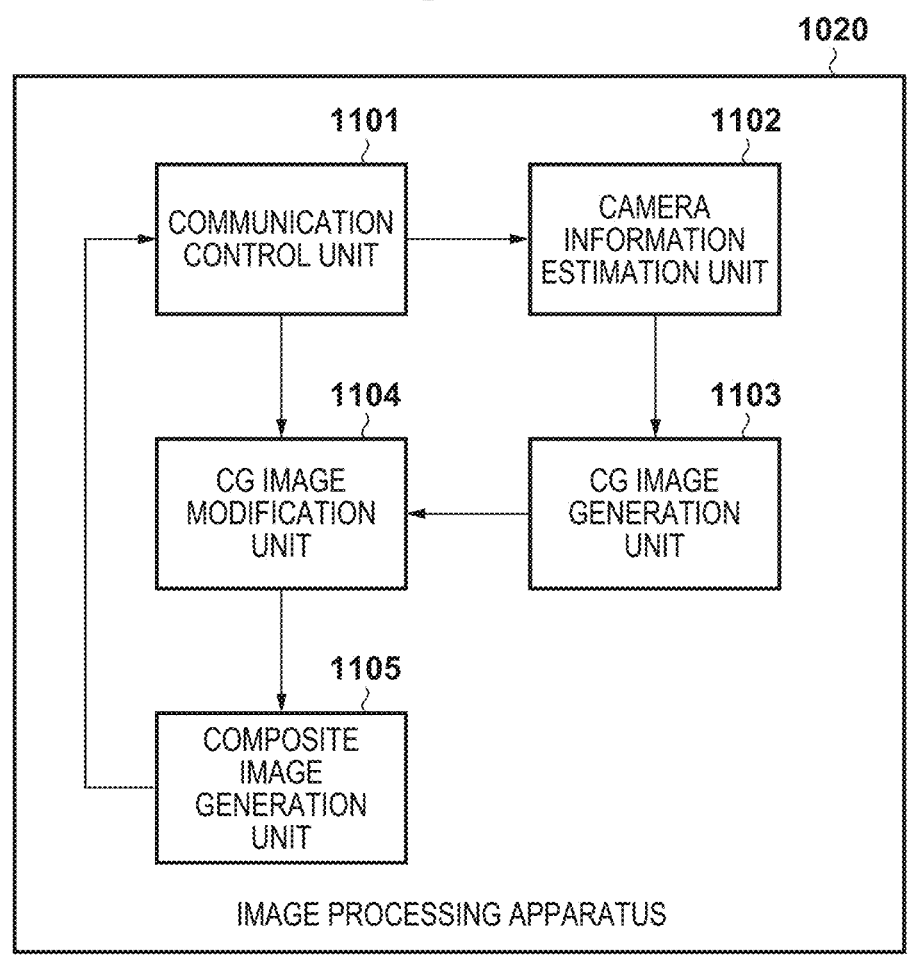
FIG. 11 is a block diagram illustrating an example of a functional configuration of an image processing apparatus according to a fourth embodiment.

FIG. 11 is a diagram illustrating an example of a functional configuration relating to a process for modifying a CG image based on an image captured by the camera 1010 of the image processing apparatus 1020.

The image processing apparatus 1020 includes a communication control unit 1101, a camera information estimation unit 1102, a CG image generation unit 1103, a CG image modification unit 1104, and a composite image generation unit 1105.

The communication control unit 1101, using the communication unit 114, receives a captured image from the camera 1010 and internal parameters of the camera 1010. The communication control unit 1101 outputs the received captured image and internal parameters to the camera information estimation unit 1102. Further, the communication control unit 1101 outputs the captured image to the CG image modification unit 1104. Further, the communication control unit 1101 uses the communication unit 1024 to transmit the composite image received from the composite image generation unit 1105 to the display apparatus 1030.

The camera information estimation unit 1102 estimates the three-dimensional information of the real space and the external parameters of the camera 1010 based on the captured image and the internal parameters of the camera 1010 obtained from the communication control unit 1101. The camera information estimation unit 1102 outputs the internal parameters input from the communication control unit 1101, and the three-dimensional information of the generated real space and the external parameters of the camera 1010 to the CG image generation unit 1103.

The CG image generation unit 1103 captures a virtual object based on the camera parameter input from the camera information estimation unit 1102, and generates a CG image. Since the camera parameters are those of the camera 1010, the angle of view and the position and orientation of the generated CG image coincide with the angle of view and the position and orientation of the captured image of the camera 1010. The CG image generation unit 1103 outputs the generated CG image, the arrangement information of the virtual object, the three-dimensional information of the real space input from the camera information estimation unit 1102 and the camera parameters to the CG image modification unit 1104.

The CG image modification unit 1104 modifies the CG image received from the CG image generation unit 1103 using the image captured by the camera 1010 sent from the communication control unit 1101, the arrangement information of the virtual object sent from the CG image generation unit 1103, the three-dimensional information of the real space, and the camera parameters. The CG image modification unit 1104 sends the modified CG image and the captured image of the camera 1010 to the composite image generation unit 1105. The modification of CG images will be described later with reference to FIGS. 12A and 12B.

The composite image generation unit 1105, by compositing the captured image and the CG image of the camera 1010 inputted from the CG image modification unit 1104, generates a composite image in which CG are rendered on the captured image of the camera 1010. The composite image generation unit 1105 outputs the generated composite image to the communication control unit 1101.

<Explanation on Modification of the CG Image and Generation of the Composite Image>

Figure 12:
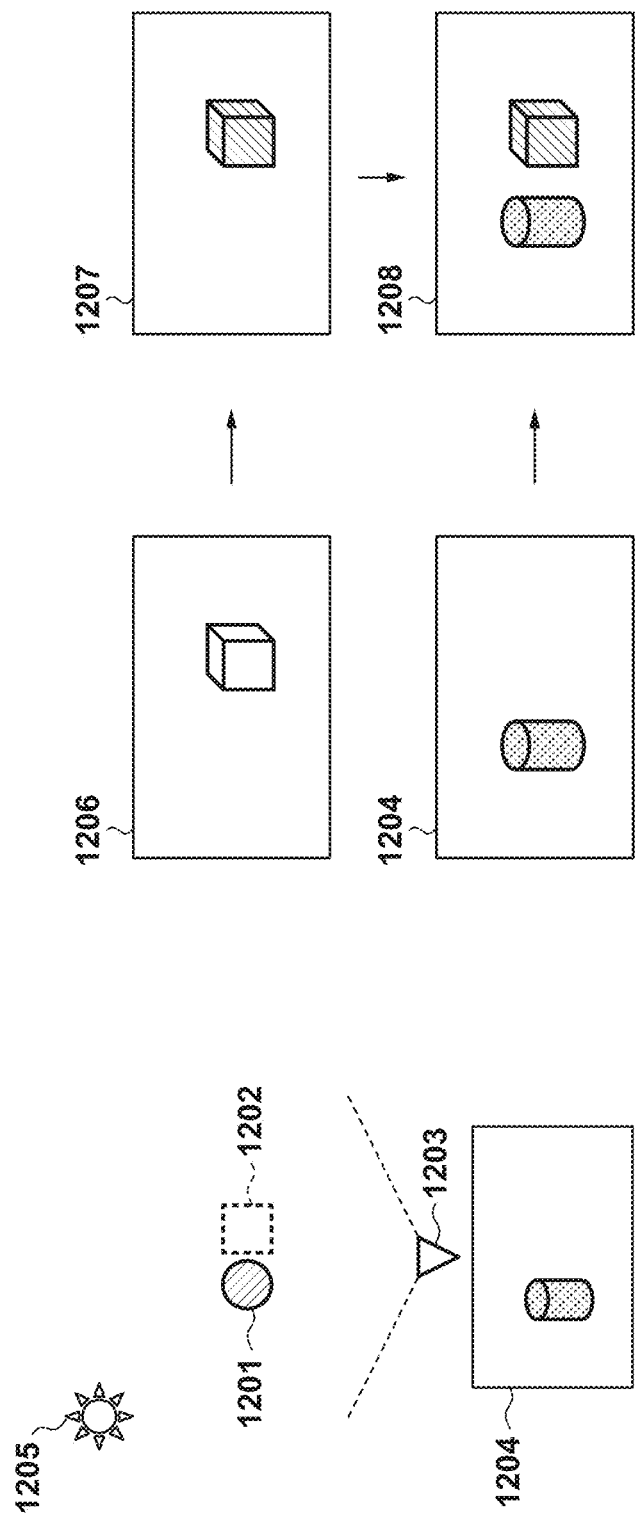
FIGS. 12A and 12B are diagrams for explaining generation of composite images according to the fourth embodiment.

A procedure for modification of the CG image and generation of the composite image according to the fourth embodiment will be described with reference to FIGS. 12A and 12B. Here, as an example of the modification of the CG image by the CG image modification unit 1104, a mode in which the tint of the CG image is changed based on a captured image of a real object will be described. FIG. 12A is a schematic diagram in which a situation where a real object 1201 in a capturing space of the camera 1010 and a virtual object 1202 that does not actually exist in a capturing space are captured by a real camera (virtual camera) 1203 is seen in a bird's-eye view. Incidentally, the position and orientation of the real camera and the virtual camera are aligned. FIG. 12B is a schematic diagram for explaining how the captured image 1204 and the CG image 1206 of FIG. 12A are composited.

The real camera 1203 captures the real object 1201 and generates a captured image 1204. The real camera 1203 corresponds to the camera 1010. The real object 1201 has a darker color than when front-lit since it is back-lit by illumination of a light source 1205 which is the sun or a light or the like. The image processing apparatus 1020 estimates three-dimensional information including the real object 1201 and external parameters of the camera based on the captured image 1204 captured by the real camera 1203. Then, the image processing apparatus 1020 generates the CG image 1206 based on the camera parameters of the camera 1010. Furthermore, the image processing apparatus 1020 generates a CG image 1207 by modifying the saturation and brightness of the color of the CG image 1206 to be close to the saturation and brightness of the color of the real object 1201 based on the estimated three-dimensional information and the captured image 1204. Here, the real object used for modifying the color saturation and brightness of the CG image 1206 is selected for having a distance closest to that of the virtual object, for example. Finally, the image processing apparatus 1020 generates a composite image 1208 by superimposing the CG image 1207 that was modified and the captured image 1204.

By modifying the tint of the virtual object 1202 appearing in the CG image 1206 in accordance with the color information of the real object 1201 appearing in the captured image 1204 as described above, a natural composite image 1208 can be generated without imitating the light source 1205 in the virtual space.

<Control for Modification of the CG Image and Generation of the Composite Image>

Figure 13:
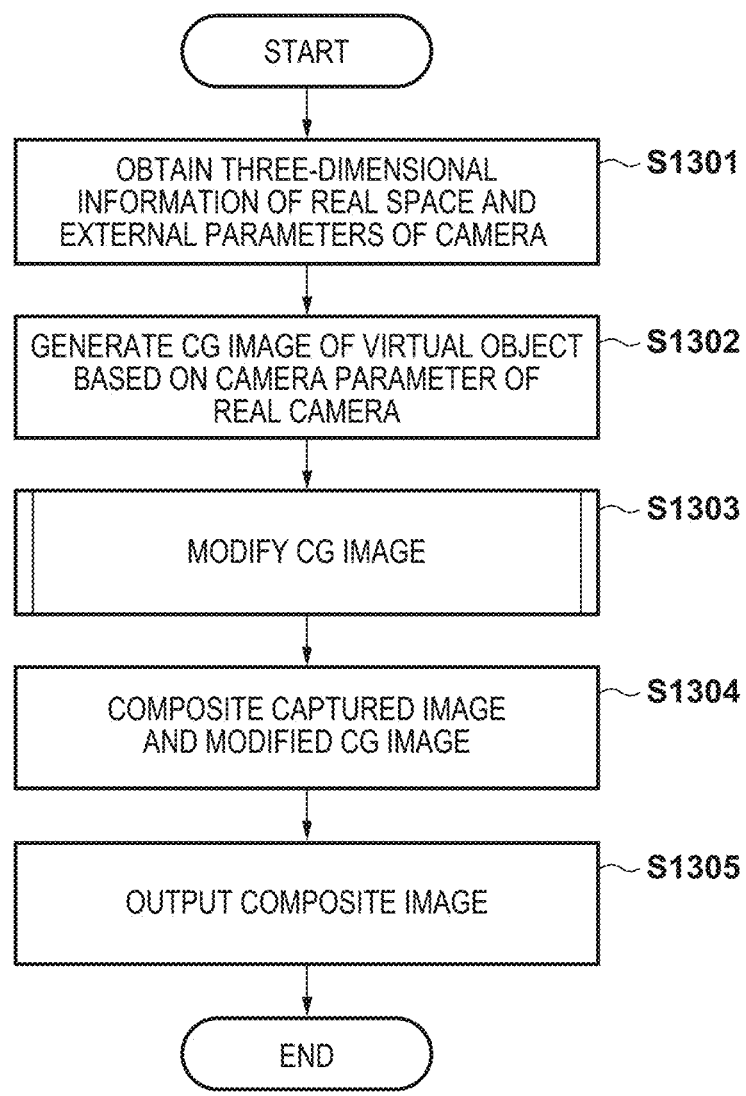
FIG. 13 is a flowchart showing an example of a composite image generation process according to the fourth embodiment.

FIG. 13 is a flowchart showing a process of compositing a captured image and a CG image according to the present embodiment. The process shown in FIG. 13 is realized, for example, by a control program stored in the ROM 113 being read out to the RAM 112 and the CPU 111 executing it. The communication control unit 1101 receives the captured image and the internal parameters from the camera 1010. When the camera information estimation unit 1102 receives the received data from the communication control unit 1101, the processing shown in FIG. 13 is started.

In step S1301, the camera information estimation unit 1102 obtains the captured image and the internal parameters of the camera 1010. Then, based on that obtained data, three-dimensional information of the real space and the external parameters of the camera 1010 are estimated. The camera information estimation unit 1102 outputs the camera parameters and the three-dimensional information of the real space to the CG image generation unit 1103.

In step S1302, the CG image generation unit 1103 obtains camera parameters of the camera 1010 and 3D data of the virtual object, and generates a CG image in which the virtual object appears. The CG image generation unit 1103 outputs the generated CG image, arrangement information of the virtual object, three-dimensional information of the real space, and camera parameters to the CG image modification unit 1104.

In step S1303, the CG image modification unit 1104 modifies the CG image input from the CG image generation unit 1103 based on the arrangement information of the virtual object inputted from the CG image generation unit 1103, the three-dimensional information of the real space, the camera parameters, and the captured image inputted from the communication control unit 1101. Details of the processing for modifying the CG image in step S1303 will be described later with reference to FIG. 14. The CG image modification unit 1104 outputs the modified CG image and the captured image to the composite image generation unit 1105.

In step S1304, the composite image generation unit 1105 composites the captured image and the CG image inputted from the CG image modification unit 1104, and generates a composite image. Thereafter, in step S1305, the composite image generation unit 1105 outputs the generated composite image. In the present embodiment, the composite image generation unit 1105 transmits the composite image to the display apparatus 1030 via the communication control unit 1101. The above is processing for compositing an image captured by the camera 1010 and a CG image, according to the fourth embodiment.

<Explanation of the CG Image Modification Processing>

Figure 14:
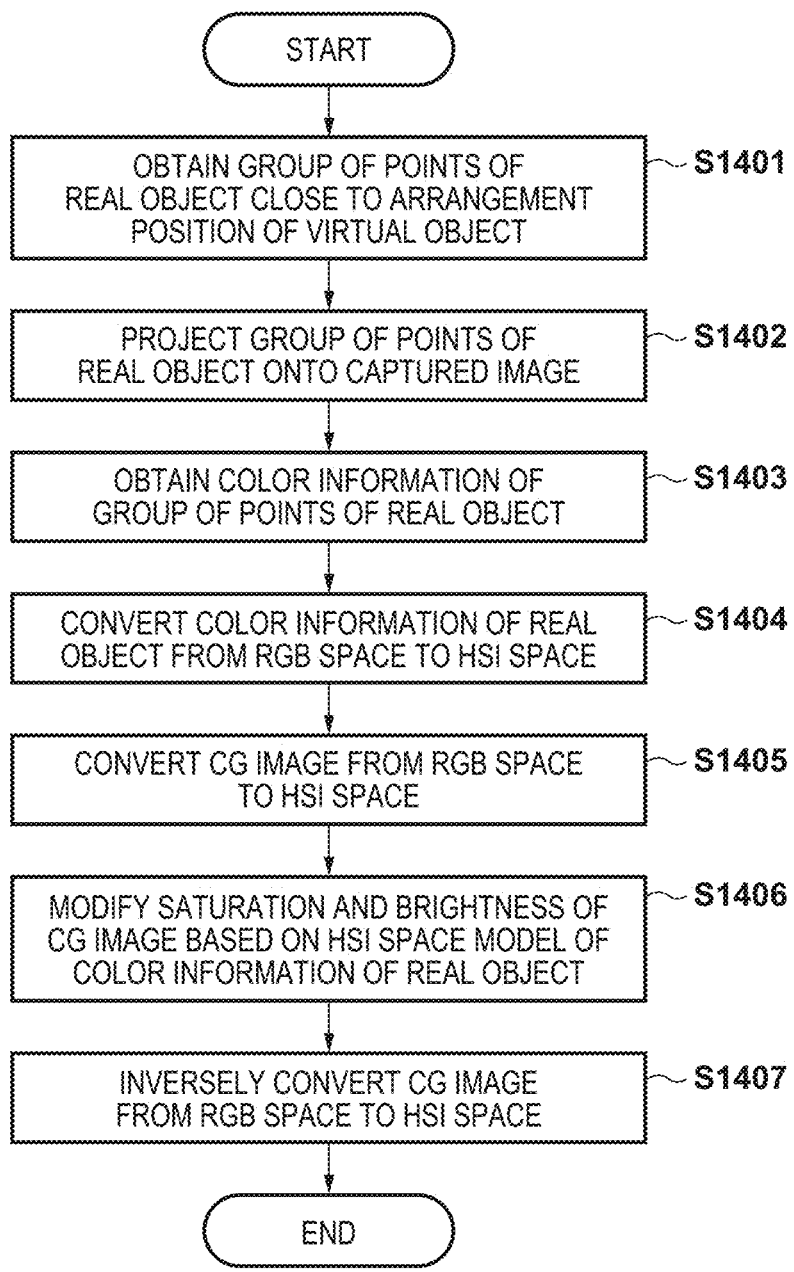
FIG. 14 is a flowchart showing an example of composite image modification processing according to the fourth embodiment.

FIG. 14 is a flowchart showing an example of a process for modifying a CG image according to the present embodiment, and shows in detail the process of modifying the CG image in step S1303 of FIG. 13. In the modification processing of the CG image in the fourth embodiment, color information of the CG image is determined and modified based on saturation and brightness of a captured image of a real object that is close to the virtual object in the three-dimensional space. More specifically, the CG image modification unit 1104 obtains the saturation and the brightness of the captured image of a real object whose arrangement position is close to the virtual object in the real (virtual) space, and changes the saturation and the brightness of the virtual object so as to approach them. The saturation and brightness of the CG image before modification are calculated by the CG image generation unit 1103 based on texture data and material data of the virtual object. The processing shown in FIG. 14 is executed by the CG image modification unit 104. The processing shown in FIG. 14 is started when the captured image is obtained from the communication control unit 1101 and the three-dimensional information of the real space, the CG image, the arrangement information of the virtual object, and the camera parameters are obtained from the CG image generation unit as triggers. However, as the three-dimensional information of the real space, a set of three-dimensional coordinates (group of points) of the real object group is envisioned.

In step S1401, the CG image modification unit 1104 obtains a group of points of a real object close to the arrangement position of the virtual object from the set of three-dimensional coordinates (group of points) of a group of real objects inputted from the CG image generation unit. For example, the CG image modification unit 1104 acquires a group of points of a real object existing within a predetermined distance from the arrangement position of the virtual object. The group of points may include coordinates of a plurality of points, or may be coordinates of one point. The selection of the group of points of the real object may be determined based on the group of points and type information corresponding to the group of points when group of points and their type information exist. For example, when a CG image of a virtual signboard advertisement is to be modified, a group of points of a signboard existing in a real space may be preferentially selected.

In step S1402, the CG image modification unit 1104 projects the group of points of the selected real object onto the captured image inputted from the communication control unit 1101 based on the camera parameters inputted from the CG image generation unit.

In step S1403, the CG image modification unit 1104 obtains the color information of the captured image of the projection destination of the group of points of the real object.

In step S1404, the CG image modification unit 1104 converts the obtained color information from the RGB space to the HSI space.

In step S1405, the CG image modification unit 1104 converts the color information of the CG image generated by the CG image generation unit 1103 from the RGB space to the HSI space.

In step S1406, the CG image modification unit 1104 modifies the saturation and brightness of the CG image based on the HSI space model of captured image color information. For example, the CG image modification unit 1104 computes the average value of the saturation and the brightness of the color information of the captured image obtained in step S1404, respectively. Then, the CG image modification unit 1104 changes the saturation and the brightness of the CG image so that the respective average values of the saturation and the brightness of the CG image aligns with or approaches the respective average values calculated for the color information of the captured image, while the hue of the CG image remains unchanged.

In step S1407, the CG image modification unit 1104 inversely converts the CG image from the RGB space to the HSI space. The above is an example of the modification processing of the CG image according to the fourth embodiment.

As described above, in the fourth embodiment, processing for modifying the saturation and brightness of the CG image is performed using the captured image of the camera 1010. As a result, in the augmented reality, when the captured image and the CG image are superimposed, the tints of the real object in the captured image and the virtual object in the CG image become close to each other, and it becomes possible to generate a more natural composite image. The various methods described in the first embodiment to third embodiment, such as the tint processing method of the first embodiment, can also be used in combination in the fourth embodiment as appropriate.

Fifth Embodiment

In the fourth embodiment, a process of displaying a composite image in which a CG image is superimposed on a real image on the display apparatus 1030 was described. In the fifth embodiment, an optical see-through display apparatus, for example, an optical see-through HMD for augmented/mixed reality, illustrating an aspect of displaying a CG image modified based on a captured real image. Parts common to the fourth embodiment are omitted or simplified for explanation.

Figure 15:
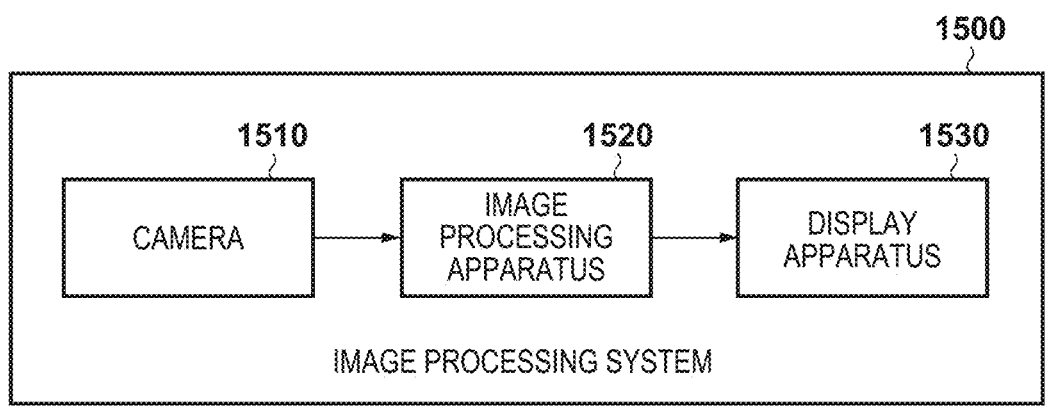
FIG. 15 is a block diagram illustrating an example of a configuration of the image processing system according to a fifth embodiment.

FIG. 15 is a diagram illustrating an example of an overall configuration of an image processing system according to the present embodiment. The image processing system 1500 obtains an image captured by a camera, and determines color information of a CG image according to color information of a real object appearing in the captured image. The image processing system 1500 displays a CG image in which the color information is determined. The image processing system 1500 includes a camera 1510, an image processing apparatus 1520, and a display apparatus 1530. However, the camera 1510 is similar to the camera 1010. An example of the hardware configuration of the image processing apparatus 1520 of the fifth embodiment is as described in the first embodiment (FIG. 1 (b)).

Unlike the image processing apparatus 1020, the image processing apparatus 1520 outputs the modified CG image on the basis of the captured image of the camera 1510 to the display apparatus 1530 as is without superimposing it on the captured image. The rest of the processing is the same as that of the image processing apparatus 1020.

A display apparatus 1530 displays the CG image generated and outputted by the image processing apparatus 1520. The display apparatus 1530 is, for example, an optical see-through HMD, and displays a CG image on a transmissive screen and superimposes the CG image on a real scene to realize augmented/mixed reality.

In the present embodiment, the camera 1510, the image processing apparatus 1520, and the display apparatus 1530 are envisioned as separate apparatuses, but the present disclosure is not limited thereto, and the image processing apparatus 1520 may also function as the camera 1510 or the display apparatus 1530 similarly to the fourth embodiment.

Figure 16:
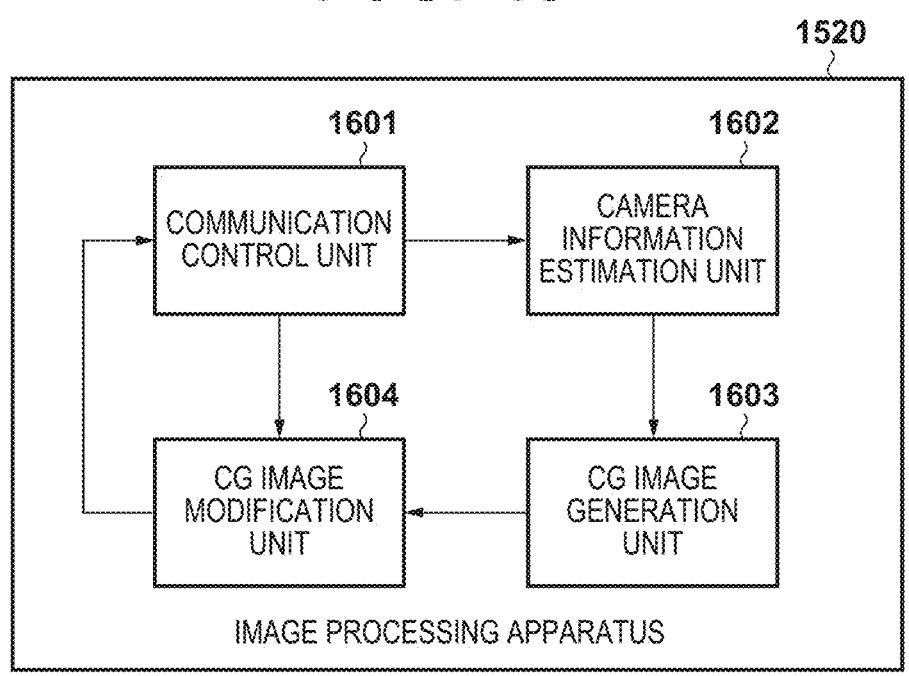
FIG. 16 is a block diagram illustrating an example of a functional configuration of the image processing apparatus according to the fifth embodiment.

FIG. 16 is a diagram illustrating an example of a functional configuration relating to a process for modifying a CG image based on an image captured by the camera 1510 of the image processing apparatus 1520.

The image processing apparatus 1520 includes a communication control unit 1601, a camera information estimation unit 1602, a CG image generation unit 1603, and a CG image modification unit 1604. However, the camera information estimation unit 1602 and the CG image generation unit 1603 are the same as the camera information estimation unit 1102 and the CG image generation unit 1103, respectively.

The communication control unit 1601, using a communication unit 114, receives a captured image from the camera 1510 and internal parameters of the camera 1510. The communication control unit 1601 outputs the received captured image and the internal parameters to the camera information estimation unit 1602 and the captured image to the CG image modification unit 1604. Further, the communication control unit 1601 uses the communication unit 114 to transmit the CG image received from the CG image modification unit 1604 to the display apparatus 1530.

The CG image modification unit 1604 modifies the CG image received from the CG image generation unit 1603 using the image captured by the camera 1510 sent from the communication control unit 1601, the arrangement information of the virtual object sent from the CG image generation unit 1103, the three-dimensional information of the real space, and the camera parameters. The CG image modification unit 1604 sends the modified CG image to the communication control unit 1601. The CG image processing method is the same as the CG image processing method of the fourth embodiment.

FIG. 17 is a flowchart showing a CG image generation process according to the fifth embodiment. As described above, in the fifth embodiment, the CG image generated based on the captured image of the camera 1510 is output directly to the display apparatus 1530 without superimposing the captured image. The process shown in FIG. 17 is realized, for example, by a control program stored in the ROM 113 being read out to the RAM 112 and the CPU 111 executing it. The communication control unit 1601 receives the captured image and the internal parameters from the camera 1510. When the camera information estimation unit 1602 receives the received data from the communication control unit 1601, the processing shown in FIG. 17 is started. However, step S1701 and step S1702 are the same as step S1301 and step S1302, respectively.

In step S1703, the CG image modification unit 1604 modifies the CG image input from the CG image generation unit 1603 based on the arrangement information of the virtual object inputted from the CG image generation unit 1603, the three-dimensional information of the real space, the camera parameters, and the captured image inputted from the communication control unit 1601. The modification of the CG image is as described in the fourth embodiment (FIG. 14). In step S1704, the CG image modification unit 1604 outputs the modified CG image to the communication control unit 1601 and ends this process. The modified CG image is transmitted from the communication control unit 1601 to the display apparatus 1530. The above is processing for generating the CG image according to the fifth embodiment.

As described above, in the fifth embodiment, the CG image is modified using an image captured by the camera 1510, and the CG image is displayed on a transmissive screen such as an optical see-through HMD, so that the tint of the actual scene and the CG image become close to each other, thereby making it possible to realize more natural augmented/mixed reality. The CG image processing method of the fourth embodiment and the various methods described in the first embodiment to third embodiment can also be used in combination in the fifth embodiment as appropriate.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-206041, filed Dec. 11, 2020 and Japanese Patent Application No. 2021-166499, filed Oct. 8, 2021, which are hereby incorporated by reference herein in their entirety.

What is claimed is:

1. An image processing apparatus, comprising:
one or more memories storing instructions; and
one or more processors executing the instructions to:
obtain one or plurality of images based on capturing by one or plurality of image capturing apparatuses;
obtain viewpoint information indicating position and orientation of a virtual viewpoint, and information related to a virtual object;
generate a two-dimensional image including the virtual object, based on the viewpoint information and the obtained information related to the virtual object; and
modify saturation and/or lightness of the virtual object included in the two-dimensional image to match or approach saturation and/or lightness of a real object included in the two-dimensional image, or resolution of the virtual object included in the two-dimensional image to match or approach resolution of the real object.

2. The apparatus according to claim 1, wherein one or plurality of images include a captured image that is captured by the plurality of image capturing apparatuses, a partial image for which a foreground object is extracted from the captured image, or a partial image for which a region of a background object is extracted from the captured image.

3. The apparatus according to claim 1, wherein the one or more processors further execute the instructions to:
generate a virtual viewpoint image observed from a virtual viewpoint based on the plurality of images and the viewpoint information, and
generate a composite image based on the virtual viewpoint image and the two-dimensional image.

4. The apparatus according to claim 3, wherein the composite image is an augmented reality image generated based on the one or plurality of images captured by the one or plurality of image capturing apparatuses.

5. The apparatus according to claim 1, wherein the two-dimensional image is a CG image generated based on the one or plurality of images captured by the one or plurality of image capturing apparatuses.

6. The apparatus according to claim 3, wherein the composite image is generated by superimposing the virtual viewpoint image.

7. The apparatus according to claim 1, wherein the information related to the virtual object includes three-dimensional shape data of the virtual object or a position in a virtual space of the virtual object.

8. The apparatus according to claim 1, wherein in the generation, the color information of the virtual object is determined based on color information of a real object selected based on a positional relationship with respect to the virtual object.

9. The apparatus according to claim 1, wherein in the generation, the color information of the virtual object is determined based on the color information of a foreground object that is closest to the virtual object or that is within a predetermined distance from the virtual object.

10. The apparatus according to claim 1, wherein in the generation, the color information of the virtual object is determined based on color information of a background object or a portion of a background object selected based on a distance from the virtual object.

11. The apparatus according to claim 1, wherein in the generation, at least one of a saturation and a brightness that color information of the virtual object represents is determined based on at least one of a saturation and a brightness at which color information of the real object is to be represented.

12. The apparatus according to claim 1, wherein in the generation, a saturation and a brightness of the virtual object are changed so that average values of a saturation and a brightness of the color information respectively match or approach average values of a saturation and a brightness of the virtual object respectively.

13. The apparatus according to claim 1, wherein in the generation, a resolution of color information of the virtual object is changed in a case where a difference between a resolution of the color information of the virtual object and a resolution of the color information of the real object is greater than a predetermined value.

14. The apparatus according to claim 1, wherein the one or more processors further executes the instructions to identify a type of a real object, and
wherein in the generation, color information of the virtual object is changed based on color information of a real object of the identified type.

15. The apparatus according to claim 1, wherein in the generation, color information of the virtual object is determined based on color information of an image selected from among the plurality of images based on a position of the virtual object and a direction of a surface of the virtual object.

16. The apparatus according to claim 1, wherein the virtual object is an object that is not captured by the one or plurality of image capturing apparatuses.

17. A method for controlling an image processing apparatus, the method comprising:
obtaining one or plurality of images based on capturing by one or plurality of image capturing apparatuses;
obtaining viewpoint information indicating position and orientation of a virtual viewpoint, and information related to a virtual object;
generating a two-dimensional image including the virtual object, based on the viewpoint information; and
modifying saturation and/or lightness included in the two-dimensional image to match or approach saturation and/or lightness of a real object included in the two-dimensional image, or resolution of the virtual object included in the two-dimensional image to match or approach resolution of the real object.

18. A non-transitory computer-readable storage medium storing a program for causing a computer to execute a method for controlling an image processing apparatus, the method comprising:
obtaining one or plurality of images based on capturing by one or plurality of image capturing apparatuses;
obtaining viewpoint information indicating position and orientation of a virtual viewpoint, and information related to a virtual object;
generating a two-dimensional image including the virtual object, based on the viewpoint information; and
modifying saturation and/or lightness included in the two-dimensional image to match or approach saturation and/or lightness of the real object, or resolution of the virtual object in the two-dimensional image to match or approach resolution of the real object.

19. The apparatus according to claim 1, wherein in the generation, the saturation and/or the lightness of the color information of the virtual object is changed while hue of the color information of the virtual object is preserved.

20. The apparatus according to claim 1, wherein the resolution of color information of the real object is determined from number of pixels in a range of the real object in an image which the color information is based on and an actual size of the real object in three-dimensional space.

21. The apparatus according to claim 1, wherein the real object is a structure fixed in the real space, and the virtual object is a virtual structure fixedly arranged in the real space.

22. The apparatus according to claim 1, wherein the real object is a signboard for advertisement in the real space, and the virtual object is a virtual signboard for advertisement.

* * * * *